(12) United States Patent
Libin et al.

(10) Patent No.: US 7,660,994 B2
(45) Date of Patent: Feb. 9, 2010

(54) ACCESS CONTROL

(75) Inventors: Phil Libin, Cambridge, MA (US); Silvio Micali, Brookline, MA (US)

(73) Assignee: CoreStreet, Ltd., Cambridge, MA (US)

( * ) Notice: Subject to any disclaimer, the term of this patent is extended or adjusted under 35 U.S.C. 154(b) by 959 days.

(21) Appl. No.: 10/876,275

(22) Filed: Jun. 24, 2004

(65) Prior Publication Data

US 2005/0010783 A1  Jan. 13, 2005

Related U.S. Application Data

(63) Continuation-in-part of application No. 09/915,180, filed on Jul. 25, 2001, now Pat. No. 6,766,450, which is a continuation of application No. 09/483,125, filed on Jan. 14, 2000, now Pat. No. 6,292,893, which is a continuation of application No. 09/356,745, filed on Jul. 19, 1999, now abandoned, which is a continuation of application No. 08/823,354, filed on Mar. 24, 1997, now Pat. No. 5,960,083, which is a continuation of application No. 08/559,533, filed on Nov. 16, 1995, now Pat. No. 5,666,416.

(60) Provisional application No. 60/482,179, filed on Jun. 24, 2003, provisional application No. 60/006,038, filed on Oct. 24, 1995.

(51) Int. Cl.
*H04K 1/00* (2006.01)

(52) U.S. Cl. .......................... 713/182; 713/157; 713/158

(58) Field of Classification Search ...................... 726/2, 726/4–7, 10, 21, 1, 20, 9; 713/155, 170, 713/175, 182, 183, 184, 185, 158, 156, 157, 713/161, 177, 179, 160, 166, 172, 159, 173, 713/178, 186; 380/278

See application file for complete search history.

(56) References Cited

U.S. PATENT DOCUMENTS 4,200,770 A  4/1980  Hellman et al.

(Continued)

FOREIGN PATENT DOCUMENTS

EP  0 618 550 A1  3/1994

(Continued)

OTHER PUBLICATIONS

Oorschot Van, et al., "Handbook of Applied Cryptography", Handbook of Applied Cryptography; [CRC Press Series on Discrete Mathematics and its Applications], Boca Raton, FL, CRC Press., US, Jan. 1, 1997, pp. 395-397, XP002134672.

(Continued)

*Primary Examiner*—Eleni A Shiferaw
(74) *Attorney, Agent, or Firm*—Muirhead and Saturnelli, LLC

(57) ABSTRACT

An administration entity controls access to an electronic device by generating credentials and a plurality of corresponding proofs, wherein no valid proofs are determinable given only the credentials and values for expired proofs. The electronic device receives the credentials and, if access is authorized at a particular time, the electronic device receives a proof corresponding to the particular time and confirms the proof using the credentials. A single administration entity may generate the credentials and generate the proofs and/or there may be a first administration entity that generates the credentials and other administration entities that generate proofs. The credentials may be a digital certificate that includes a final value that is a result of applying a one way function to a first one of the proofs.

50 Claims, 9 Drawing Sheets

U.S. PATENT DOCUMENTS

| | | | |
|---|---|---|---|
| 4,218,582 A | 8/1980 | Hellman et al. | |
| 4,309,569 A | 1/1982 | Merkle | |
| 4,326,098 A | 4/1982 | Bouricius et al. | |
| 4,825,052 A | 4/1989 | Chemin et al. | |
| 4,879,747 A | 11/1989 | Leighton et al. | |
| 4,881,264 A | 11/1989 | Merkle | |
| 4,888,801 A | 12/1989 | Foster et al. | |
| 4,926,480 A | 5/1990 | Chaum | |
| 4,943,707 A | 7/1990 | Boggan | |
| 4,944,009 A | 7/1990 | Micali et al. | |
| 4,995,081 A | 2/1991 | Leighton et al. | |
| 5,003,597 A | 3/1991 | Merkle | |
| 5,005,200 A | 4/1991 | Fischer | |
| 5,016,274 A | 5/1991 | Micali et al. | |
| 5,097,504 A | 3/1992 | Camion et al. | |
| 5,136,646 A | 8/1992 | Haber et al. | |
| 5,136,647 A | 8/1992 | Haber et al. | |
| 5,157,726 A | 10/1992 | Merkle et al. | |
| 5,214,702 A | 5/1993 | Fischer | |
| 5,231,666 A | 7/1993 | Matyas | |
| 5,261,002 A | 11/1993 | Perlman et al. | |
| 5,276,737 A | 1/1994 | Micali | |
| 5,299,263 A | 3/1994 | Beller et al. | |
| 5,307,411 A | 4/1994 | Anvret et al. | |
| 5,315,657 A | 5/1994 | Abadi et al. | |
| 5,315,658 A | 5/1994 | Micali et al. | |
| 5,340,969 A | 8/1994 | Cox | |
| 5,351,302 A | 9/1994 | Micali et al. | |
| 5,371,794 A | 12/1994 | Diffie et al. | |
| 5,396,624 A | 3/1995 | Campbell, Jr. | |
| RE34,954 E | 5/1995 | Haber et al. | |
| 5,420,927 A | 5/1995 | Micali | |
| 5,432,852 A | 7/1995 | Leighton et al. | |
| 5,434,919 A | 7/1995 | Chaum | |
| 5,450,493 A | 9/1995 | Maher | |
| 5,497,422 A | 3/1996 | Tysen et al. | |
| 5,499,296 A | 3/1996 | Micali | |
| 5,519,778 A | 5/1996 | Leighton et al. | |
| 5,537,475 A | 7/1996 | Micali | |
| 5,544,322 A | 8/1996 | Cheng et al. | |
| 5,551,027 A | 8/1996 | Choy et al. | |
| 5,553,145 A | 9/1996 | Micali | |
| 5,604,804 A | 2/1997 | Micali | |
| 5,606,617 A | 2/1997 | Brands et al. | |
| 5,610,982 A | 3/1997 | Micali | |
| 5,615,268 A | 3/1997 | Bisbee et al. | |
| 5,615,269 A | 3/1997 | Micali | |
| 5,629,982 A | 5/1997 | Micali | |
| 5,638,447 A | 6/1997 | Micali | |
| 5,659,616 A | 8/1997 | Sudia | |
| 5,659,617 A | 8/1997 | Fischer | |
| 5,666,414 A | 9/1997 | Micali | |
| 5,666,415 A | 9/1997 | Kaufman | |
| 5,666,416 A | 9/1997 | Micali | |
| 5,666,420 A | 9/1997 | Micali | |
| 5,677,955 A | 10/1997 | Doggett et al. | |
| 5,687,235 A | 11/1997 | Perlman et al. | |
| 5,699,431 A | 12/1997 | Van Oorschot et al. | |
| 5,717,757 A | 2/1998 | Micali | |
| 5,717,758 A | 2/1998 | Micali | |
| 5,717,759 A | 2/1998 | Micali | |
| 5,742,035 A | 4/1998 | Kohut | |
| RE35,808 E | 5/1998 | Micali | |
| 5,748,738 A | 5/1998 | Bisbee et al. | |
| 5,768,379 A * | 6/1998 | Girault et al. | 713/185 |
| 5,774,552 A | 6/1998 | Grimmer | |
| 5,790,665 A | 8/1998 | Micali | |
| 5,790,790 A | 8/1998 | Smith et al. | |
| 5,793,868 A | 8/1998 | Micali | |
| 5,799,086 A | 8/1998 | Sudia | |
| 5,812,670 A | 9/1998 | Micali | |
| 5,825,880 A | 10/1998 | Sudia et al. | |
| 5,826,262 A | 10/1998 | Bui et al. | |
| 5,841,865 A | 11/1998 | Sudia | |
| 5,850,442 A * | 12/1998 | Muftic | 705/65 |
| 5,850,451 A | 12/1998 | Sudia | |
| 5,857,022 A | 1/1999 | Sudia | |
| 5,867,578 A * | 2/1999 | Brickell et al. | 713/180 |
| 5,875,894 A | 3/1999 | Stromme | |
| 5,903,651 A | 5/1999 | Kocher | |
| 5,903,882 A | 5/1999 | Asay et al. | |
| 5,960,083 A | 9/1999 | Micali | |
| 5,982,898 A | 11/1999 | Hsu et al. | |
| 5,995,625 A | 11/1999 | Sudia et al. | |
| 6,009,177 A | 12/1999 | Sudia | |
| 6,026,163 A | 2/2000 | Micali | |
| 6,044,462 A | 3/2000 | Zubeldia et al. | |
| 6,061,448 A | 5/2000 | Smith et al. | |
| 6,097,811 A | 8/2000 | Micali | |
| 6,119,137 A | 9/2000 | Smith et al. | |
| RE36,918 E | 10/2000 | Micali | |
| 6,134,326 A | 10/2000 | Micali et al. | |
| 6,137,884 A | 10/2000 | Micali | |
| 6,141,750 A | 10/2000 | Micali | |
| 6,151,675 A | 11/2000 | Smith | |
| 6,189,103 B1 | 2/2001 | Nevarez et al. | |
| 6,192,407 B1 | 2/2001 | Smith et al. | |
| 6,209,091 B1 | 3/2001 | Sudia et al. | |
| 6,216,231 B1 | 4/2001 | Stubblebine | |
| 6,223,284 B1 | 4/2001 | Novoa et al. | |
| 6,263,446 B1 * | 7/2001 | Kausik et al. | 726/5 |
| 6,292,893 B1 | 9/2001 | Micali | |
| 6,301,659 B1 | 10/2001 | Micali | |
| 6,385,655 B1 | 5/2002 | Smith et al. | |
| 6,397,329 B1 | 5/2002 | Aiello et al. | |
| 6,404,337 B1 | 6/2002 | Van Till et al. | |
| 6,442,689 B1 | 8/2002 | Kocher | |
| 6,470,086 B1 | 10/2002 | Smith | |
| 6,487,599 B1 | 11/2002 | Smith et al. | |
| 6,487,658 B1 | 11/2002 | Micali | |
| 6,502,191 B1 | 12/2002 | Smith et al. | |
| 6,516,411 B2 | 2/2003 | Smith | |
| 6,529,956 B1 | 3/2003 | Smith et al. | |
| 6,532,540 B1 | 3/2003 | Kocher | |
| 6,609,196 B1 | 8/2003 | Dickinson, III et al. | |
| 6,651,166 B1 | 11/2003 | Smith et al. | |
| 6,658,568 B1 | 12/2003 | Ginter et al. | |
| 6,671,805 B1 | 12/2003 | Brown et al. | |
| 6,725,381 B1 | 4/2004 | Smith et al. | |
| 6,748,529 B2 | 6/2004 | Smith et al. | |
| 6,766,450 B2 | 7/2004 | Micali | |
| 6,826,609 B1 | 11/2004 | Smith et al. | |
| 7,000,249 B2 * | 2/2006 | Lee et al. | 726/20 |
| 7,124,302 B2 * | 10/2006 | Ginter et al. | 713/189 |
| 2001/0011255 A1 | 8/2001 | Asay et al. | |
| 2001/0050990 A1 | 12/2001 | Sudia | |
| 2002/0013898 A1 | 1/2002 | Sudia et al. | |
| 2002/0029200 A1 | 3/2002 | Dulin et al. | |
| 2002/0029337 A1 | 3/2002 | Sudia et al. | |
| 2002/0062438 A1 | 5/2002 | Asay et al. | |
| 2002/0107814 A1 | 8/2002 | Micali | |
| 2002/0165824 A1 | 11/2002 | Micali | |
| 2002/0184182 A1 | 12/2002 | Kwan | |
| 2003/0014365 A1 | 1/2003 | Inada et al. | |
| 2003/0065921 A1 | 4/2003 | Chang | |
| 2003/0105725 A1 * | 6/2003 | Hoffman | 705/75 |
| 2003/0191751 A1 | 10/2003 | Vora et al. | |
| 2003/0212888 A1 | 11/2003 | Wildish et al. | |
| 2003/0221101 A1 | 11/2003 | Micali | |
| 2004/0049675 A1 | 3/2004 | Micali et al. | |
| 2004/0111607 A1 | 6/2004 | Yellepeddy | |
| 2004/0237031 A1 | 11/2004 | Micali et al. | |
| 2005/0010783 A1 | 1/2005 | Libin et al. | |
| 2005/0033962 A1 | 2/2005 | Libin et al. | |

| | | | |
|---|---|---|---|
| 2005/0044376 A1 | 2/2005 | Libin et al. | |
| 2005/0044386 A1 | 2/2005 | Libin et al. | |
| 2005/0044402 A1 | 2/2005 | Libin et al. | |
| 2005/0055548 A1 | 3/2005 | Micali | |
| 2005/0055567 A1 | 3/2005 | Libin et al. | |
| 2005/0114653 A1 | 5/2005 | Sudia | |
| 2005/0114666 A1* | 5/2005 | Sudia | 713/175 |
| 2005/0154878 A1 | 7/2005 | Engberg et al. | |
| 2005/0154879 A1 | 7/2005 | Engberg et al. | |
| 2005/0154918 A1 | 7/2005 | Engberg | |
| 2005/0193204 A1 | 9/2005 | Engberg et al. | |
| 2005/0204129 A1* | 9/2005 | Sudia et al. | 713/158 |
| 2006/0987843 | 5/2006 | Libin | |
| 2006/0179031 A1 | 8/2006 | Lewis | |

FOREIGN PATENT DOCUMENTS

| | | |
|---|---|---|
| EP | 0 723 251 A2 | 1/1996 |
| EP | 0 798 671 A2 | 2/1997 |
| EP | 1 024 239 A1 | 1/1999 |
| FR | 2 774 833 A1 | 2/1998 |
| WO | WO 98/26385 | 6/1998 |
| WO | WO 98/43152 | 10/1998 |
| WO | WO00/10286 | 2/2000 |
| WO | WO 00/22787 | 4/2000 |
| WO | WO 01/06701 A1 | 1/2001 |
| WO | WO 01/11812 A2 | 2/2001 |
| WO | WO 01/11843 | 2/2001 |
| WO | WO01/11843 A1 | 2/2001 |
| WO | WO 01/25874 A2 | 4/2001 |

OTHER PUBLICATIONS

**Facsimile message from Chini Krishnan of Integris Security, Inc. to Professor Silvio Micali, dated Feb. 17, 1997, 7 pages including cover sheet, submitted in attached sealed envelope as Proprietary Material Not Open to Public. To Be Opened Only by Examiner or Other Authorized U.S. Patent and Trademark Office Employee.
**Facsimile message from Chini Krishnan of Integris Security, Inc. to Professor Silvio Micali, dated Feb. 25, 1997, 13 pages including cover sheet, submitted in attached sealed envelope as Proprietary Material Not Open to Public. To Be Opened Only by Examiner or Other Authorized U.S. Patent and Trademark Office Employee.
"Distributed Certificate Validation: The answer to validation scalability, availability and cost issues," *CoreStreet White Paper*, published at www.corestreet.com, Jun. 12, 2003, 14 pp.
"Distributed OCSP: Security, Scalability, and Availability for Certificate Validation," *CoreStreet White Paper*, published at www.corestreet.com, 2002, 4 pp.
"Real Time Credential Validation: Secure, Efficient Permissions Management," *CoreStreet White Paper*, published at www.corestreet.com, 2002, 5 pp.
"Real Time Credential Validation: Secure, Efficient Permissions Management," *CoreStreet White Paper*, published at www.corestreet.com, 2002-2004, 5 pp.
"Identity Services Infrastructure™: A practical approach to ensuring trust and privacy in government and industry," *CoreStreet White Paper*, published at www.corestreet.com, 2006, 13 pp.
"The Roles of Authentication, Authorization & Cryptography in Expanding Security Industry Technology," Security Industry Association, *Quarterly Technical Update*, Dec. 2005, 32 pp.
"Important FIPS 201 Deployment Considerations: Ensuring Your Implementation is Future-Ready," *White paper*, published at www.corestreet.com, 2005-2006, 11 pp.
"Vulnerability Analysis of Certificate Validation Systems," *CoreStreet White Paper*, published at www.corestreet.com, 2006, 15 pp.
"The Role of Practical Validation for Homeland Security," *CoreStreet White Paper*, published at www.corestreet.com, 2002-2004, 3 pp.
"Distributed Certificate Validation," *CoreStreet White Paper*, published at www.corestreet.com, 2006, 16 pp.
"Certificate Validation Choices: Evaluation criteria for selecting the appropriate validation mechanism for your needs," *CoreStreet white paper*, published at www.corestreet.com, 2002-2004, 8 pp.

"Nonce Sense: Freshness and Security in OCSP Responses," *CoreStreet White Paper*, published at www.corestreet.com, 2003-2004, 2 pp.
"Sistema Distruito Per Il Controllo Della Validita Dei Certificati Digitali: Prestazioni—Disponibilita'—Costi," *CoreStreet White Paper*, published at www.corestreet.com, visited Aug. 7, 2006, 17 pp.
"Analisi Della Vunlerabilita' Dei Sistemi Di Convalida Dei Certificati Digitali," *CoreStreet White Paper*, published at www.corestreet.com, visited Aug. 7, 2006, 17 pp.
Jon Shamah, "From eID to Identity Services Infrastructure—Practical implementations for sustainable success," Presentation, published at www.corestreet.com, *e-Id Conference* (Brussels, Belgium), Feb. 22, 2006, 48 pp.
"U.S. Department of Homeland Security First Responders Card Initiative," Transcript, *All Hazards Forum Conference and Exhibition*, Moderator Craig A. Wilson, Baltimore, Maryland, Oct. 26, 2005, 42 pp.
"Card-Connected System," *Functional Specification*, published at www.corestreet.com, 2005, 6 pp.
"Card-Connected System," *Architects and Engineers Specification*, published at www.corestreet.com, 2005, 11 pp.
"CoreStreet Validation Authority," *CoreStreet Data Sheet*, published at www.corestreet.com, 2006, 2 pp.
"Responder Appliance 2400," *CoreStreet Data Sheet*, published at www.corestreet.com, 2006, 1 p.
"Desktop Validation Client," *CoreStreet Data Sheet*, published at www.corestreet.com, 2006, 1 p.
"Server Validation Extension," *CoreStreet Data Sheet*, published at www.corestreet.com, 2006, 1 p.
"Path Builder System™: For Federated PKI," *CoreStreet Data Sheet*, published at www.corestreet.com, 2006, 1 p.
"PKI Toolkit: Developer toolkit to enable certificate validation," *CoreStreet Data Sheet*, published at www.corestreet.com, 2006, 1 p.
"MiniCRL," *CoreStreet data sheet*, published at www.corestreet.com, 2006, 1 p.
"PIVMAN™ System: Secure ID Checking," *CoreStreet Data Sheet*, published at www.corestreet.com, 2006, 1 p.
"The PIVMAN™ System: Implementing secure ID checking for site control in emergencies," *CoreStreet Product Implementation Overview*, published at www.corestreet.com, 2006, 4 pp.
"The PIVMAN™ System: Deployment and use case overview," *CoreStreet Product Application Overview*, published at www.corestreet.com, 2006, 4 pp.
"Card-Connected™ Access Control," *Corestreet Data Sheet*, published at www.corestreet.com, 2006, 1 p.
"FIPS 201 Solutions," *Corestreet Solutions Overview*, published at www.corestreet.com, 2005, 1 p.
"Common Criteria Factsheet: Understanding the importance of certification," Corestreet *Fact Sheet*, published at www.corestreet.com, 2006, 1 p.
"Security Requirements for Cryptographic Modules," *Federal Information Processing Standards (FIPS) Publication 140-2*, Information Technology Laboratory, National Institute of Standards and Technology, Gaithersburg, MD 20899, May 25, 2001.
"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions," *ISO/IEC JTC 1/SC 21/WG 4 and ITU-T Q 15/7 Collaborative Editing Meeting on the Directory*, Dec. 1996, 54 pp.
Christoffersson et al., *Crypto User's Handbook, A Guide for Implementors of Cryptographic Protection in Computer Systems*, Elsevier Science Publishers B. V., 1988, pp. 8-85.
M. Ito, et al., "Secret Sharing Scheme Realizing General Access Structure," Dept. of Electrical Communications, Tohoku University, Sendai, Miyagi 9890, Japan, 1987, pp. 3.6.1-3.6.4.
L. Gong, "Securely replicating authentication services," *Proceedings of the International Conference on Distributed Computing Systems*, IEEE Computer Society Press, 1989. pp. 85-91.
International Search Report from PCT/US 96/17374, dated Feb. 19, 1997, 3 pp.
C.J. Mitchell and F.C. Piper, "Key Storage in Secure Networks," *Discrete Applied Mathematics*, vol. 21, No. 3, 1988, pp. 215-228.

D. Otway and O. Rees, "Efficient and timely mutual authentication," *SIGOPS Oper. Syst. Rev.* vol. 21, No. 1, Jan. 1987, pp. 8-10.

"The Digital Signature Standard," National Institute of Standards and Technology (NIST), Proposal and Discussion, *Comm. of the ACM*, 35 (7), Jul. 1992, pp. 36-54.

F. T. Leighton, "Failsafe Key Escrow Systems," *Technical Memo 483, MIT Lab. for Computer Science*, 1994, 9 pp.

B. Fox and B. LaMacchia, "Certificate Revocation: Mechanics and Meaning," *Proceedings of Financial Cryptography '98*, Lecture Notes in Computer Science 1465, Springer-Verlag, Jan 1998, pp. 158-164.

R. Blom, "An optional class of symmetric key generation schemes," Proceedings of Advances in Cryptology-EUROCRYPT'84, Lecture Notes in Computer Science 209, Spring-Verlang, 1985, pp. 335-338.

C. Blundo, et al., "Perfectly Secure Key Distribution for Dynamic Conferences" *Proceedings of Advances in Cryptology: Crypto '92*, Springer-Verlag, Berlin, 1993, pp. 471-486.

D. Beaver, "Multiparty Protocols Tolerating Half Faulty Processors," *Proceedings of Advances in Cryptology '89*, Lecture Notes In Computer Science 435, G. Brassard, Ed. Springer-Verlag, London, 1990, pp. 560-572.

B. Schneier, *Applied Cryptography* $2^{nd}$ ed.; John Wiley & Sons, Inc., 1996, pp. 42-65, 574-576, 591, 593.

"Escrowed Encryption Standard (EES)," *Federal Information Processing Standards (FIPS) Publication 185*, Computer Systems Laboratory, National Institute of Standards and Technology, Gaithersburg, MD 20899, Feb. 1994.

S. Chokhani, "Toward a National Public Key Infrastructure," *IEEE Communications Magazine*, vol. 32, No. 9, Sep. 1994, pp. 70-74.

M. Gasser, et al., "The Digital Distributed System Security Architecture," *Proc. $12^{th}$ National Computer Security Conference*, 1989, pp. 305-319.

R. L. Rivest, et al., "SDSI—A Simple Distributed Security Infrastructure," 1996, pp. 1-39.

D. L. Chaum, "Untraceable Electronic Mail, Return Addresses, and Digital Pseudonyms," Technical Note Programming Techniques and Data Structures, *Communications of the ACM*, vol. 24, No. 2, Feb. 1981, pp. 84-88.

R. Gennaro, et al., "Robust Threshold DSS Signatures," *Proc. Of Advances in Cryptology: Eurocrypt '96*, Lecture Notes in Computer Science 1070, 1996, 20 pp.

"Federal Public Key Infrastructure (PKI) Technical Specifications: Part D—Interoperability Profiles," (DRAFT) *Federal PKI Technical Working Group, Inc.*, Cygnacom Solutions, 1995, 91 pp.

N. Nazario, "Federal Public Key Infrastructure (PKI) Version 1 Technical Specifications: Part B—Technical Security Policy," *PKI Technical Working Group*, 1996, 21 pp.

S. Chokhani and W. Ford, "Certificate Policy and Certification Practice Statement Framework," (DRAFT) *CygnaCom Solutions, Inc.*, Nov. 1996, 80 pp.

William E. Burr, et al., "A Proposed Federal PKI Using X.509 V3 Certificates," *National Institute of Standards and Technology (NIST), Gaithersburg, MD 20899*, 1996, 8 pp.

W.E. Burr, "Public Key Infrastructure (PKI) Technical Specifications (Version 1): Part C—Concept of Operations," (DRAFT) Feb. 1996, 30 pp.

Warwick Ford, "Public-Key Infrastructure Standards," *PP Presentation*, 1996, 15 pp.

William T. Polk, "Minimum Interoperability Specifications for PKI Components," *NIST presentation*, 1996, 13 pp.

Santosh Chokhani, Ph.D., "Security Considerations in Using X.509 Certificates," *PP Presentation*, 1996, 11 pp.

Donna F. Dodson, "PKI Implementation Projects," *NIST Presentation*, 1996, 17 pp.

William E. Burr, et al., "A Proposed Federal PKI Using X.509 V3 Certificates," *NIST Presentation*, 1996, 12 pp.

Noel A. Nazario, et al., "Management Model for the Federal Public Key Infrastructure," *NIST Presentation*, 1996, 9 pp.

Noel A. Nazario, "Security Policies for the Federal Public Key Infrastructure," *NIST Presentation*, 1996, 11 pp.

William Burr, et al., "Minimum Interoperability Specification for PKI Components," *Output of NIST's Cooperative Research and Development Agreements for Public Key Infrastructure development with AT&T, BBN, Certicom, Cylink, DynCorp, IRE, Motorola, Northern Telecom, Spyrus, and VeriSign*, DRAFT Version 1, 1996.

Farrell, et al., "Internet Public Key Infrastructure Part III: Certificate Management Protocols," *Internet Draft, PKIX Working Group*, Dec. 1996.

W. Polk, ed., "Requirements for the Federal Public Key Infrastructure (Version 1) Part A: Requirements," 1996, 19 pp.

Warwick Ford, "A Public Key Infrastructure for U.S. Government Unclassified but Sensitive Applications," *NORTEL/Bell-Northern Research, National Institute of Standards and Technology*, 1995, 94 pp.

B. Garner, ed., "A Dictionary of Modern Legal Usage," Oxford Univ. Press, 1987, p. 930.

L. Harn, "Group-Oriented (t, n) threshold digital signature scheme and digital multisignature," *IEE Proc-Comput. Digit. Tech.*, vol. 141, No. 5, Sep. 1994, pp. 307-313.

Oded Goldreich, "Two Remarks Concerning the Goldwasser-Micali-Rivest Signature Scheme," *Laboratory for Computer Science, Massachusetts Institute of Technology MIT/LCS/TM-315*, Sep. 1986, 10 pp.

S. Goldwasser, et al., "The Knowledge Complexity of Interactive Proof Systems," *Society for Industrial and Applied Mathematics (SIAM) J. Comput.*, vol. 18, No. 1, Feb. 1989, pp. 186-208.

"X9-Financial Services: American National Standard X9.55-1995," *American National Standards Institute, Accredited Standards Committee X9(Working Draft)*, Jul. 3, 1996, 41 pp.

S. Micali, et al., "An Efficient Zero-Knowledge Method for Answering Is He In Or Out? Questions," *Abstract of talk given at International Computer Science Institute, Berkeley, CA*, Dec. 1995.

"Information technology—Open Systems Interconnection—The Directory: Authentication framework," *International Standard ISO/IEC 9594-8*, 1995, 41 pp.

Z. Galil, et al., "Partitioned Encryption and Achieving Simultaneity by Partitioning," *Information Processing* Letters 26 (1987/88), Oct. 1987, pp. 81-88.

Paul Neil Feldman, "Optimal Algorithms for Byzantine Agreement," *Thesis submitted for Doctor of Philosophy in Mathematics at the Massachusetts Institute of Technology*, May 1988.

B. Chor, et al., "Verifiable Secret Sharing and Achieving Simultaneity in the Presence of Faults," *IEEE*, 1985, pp. 383-395.

D. Chaum, "Security Without Identification: Transaction Systems To Make Big Brother Obsolete," Communications of the ACM, vol. 28, No. 10, Oct. 1985, pp. 1030-1044.

V. Varadharajan, "Notification: A Pratical Security Problem in Distributed Systems," *Proc. of the $14^{th}$ National Computer Security Conference*, National Institute of Standards and Technology / National Computer Security Center, Oct. 1-4, 1991, pp. 386-396.

Silvio Micali, "Computationally-Sound Proofs," *Laboratory for Computer Science, Massachusetts Institute of Technology*, Apr. 11, 1995, 56 pp.

Silvio Micali, *Proc. of Advances in Cryptology-CRYPTO '92*, Lecture Notes in Computer Science 740, Aug. 1992, pp. 113-138.

J. L. Abad-Peiro, et al., "Designing a Generic Payment Service," *IBM Research Division, Zurich Research Laboratory*, Nov. 1996, 26 pp.

R. Ankney, "A Certificate-Based Authorization Model," *Fisher International*, Sep. 25, 1995, 20 pp.

D. Chaum, et al., "Multiparty Unconditionally Secure Protocols," ACM-0-89791-264, 1988, pp. 11-19.

O. Goldreich, et al., "Proofs that Yield Nothing But Their Validity or All Languages in NP Have Zero-Knowledge Proof Systems," *Journal of the Association for Computing Machinery*, vol. 38, No. 1, Jul. 1999, pp. 691-729.

M. K. Franklin, et al., "Fair Exchange with a Semi-Trusted Third Party," *Proc. of the $4^{th}$ ACM Conference on Computer and Communications Security*, Apr. 1997, 6 pp.

A. Fiat, et al., "How to Prove Yourself: Practical Solutions to Identification and Signature Problems," *Proc. of Advances in Cryptology: Proc. Crypto '86*, Lecture Notes in Computer Science 263, 1987, pp. 186-194.

D. Dolev, et al., "Non-Malleable Cryptography," ACM 089791-397-3, 1991, pp. 542-552.

Richard A. DeMillo, et al., "Cryptology in Revolution: Mathematics and Models," *Lecture Notes Prepared for the American Mathemati-* cal Society Short Course Held in San Francisco, CA, Jan. 5-6, 1981, ISBN 0-8218-0041-8, 1983, pp. 152-155.

Ivan Bjerre Damgård, "Payment Systems and Credential Mechanisms with Provable Security Against Abuse by Individuals," *Proc. of Advances in Cryptology—CRYPTO '88*, 1988, pp. 328-335.

O. Goldreich, et al., "How To Play Any Mental Game or A Completeness Theorem for Protocols with Honest Majority," ACM 0-89791-221-7, 1987, pp. 218-229.

Y. Frankel, et al., "Indirect Discourse Proofs: Achieving Efficient Fair Off-Line E-Cash," *Proc. of Advances in Cryptology, ASIACRYPT '96*, Lecture Notes in Computer Science 1163, Springer Verlag, 1996, pp. 286-300.

S. Micali, "A Secure and Efficient Digital Signature Algorithm," *Technical Memo, Laboratory for Computer Science, Massachusetts Institute of Technology, Cambridge, MA 02139*, Mar. 1994, 12 pp.

"Initial EFF Analysis of Clinton Privacy and Security Proposal," *Society for Electronic Access, The Electronic Frontier Foundation*, Apr. 1993, 3 pp.

L. Lamport, "Password Authentication with Insecure Communication," *Communications of the ACM*, Technical Note Operating Systems, vol. 24, No. 11, Nov. 1981, pp. 770-772.

J. Linn, "Privacy Enhancement for Internet Electronic Mail: Part I—Message Encipherment and Authentication Procedures," *Network Working Group Request for Comments: 1040*, Jan. 1988, 28 pp.

S. Kent, "Privacy Enhancement for Internet Electronic Mail: Part II—Certificate-Based Key Managements," *Network Working Group Request for Comments: 1422*, Feb. 1993, 30 pp.

T. Elgamal, "A Public Key Cryptosystem and a Signature Scheme Based on Discrete Logarithms," *IEEE Transactions on Information Theory*, vol. IT-31, No. 4, Jul. 1985, pp. 469-472.

R. Hauser, et al., "Lowering Security Overhead in Link State Routing," *Computer Networks*, vol. 31, Elsevier, Apr. 1999, pp. 885-894.

S. Herda, "Non-repudiation: Constituting evidence and proof in digital cooperation," *Computer Standards & Interfaces*, vol. 17, Elsevier, 1995, pp. 69-79.

S.G. Stubblebine, "Recent-Secure Authentication: Enforcing Evocation in Distributed Systems, Security and Privacy," *Proc. of the 1995 IEEE Symposium on Security and Privacy*, Section 5, 1995, pp. 224-235.

Ronald L. Rivest and Adi Shamir, "PayWord and MicroMint: Two simple micropayment schemes," *MIT Laboratory for Computer Science 545 Technology Square, Cambridge, Mass 02139; Wezmann Institute of Science Applied Mathematics Department, Rehovot, Israel*, Apr. 27, 2001, 19 pp.

R. L. Rivest et al., "A Method for Obtaining Digital Signatures and Public-Key Cryptosystems," *Communications of the ACM*, Programming Techniques, vol. 21, No. 2, Feb. 1978, pp. 120-126.

M. Bellare, et al., "Incremental cryptography: the case of hashing and signing," *Proc. of Advances in Cryptology—CRYPTO '94*, Lecture Notes in Computer Science 839, Springer-Verlag, 1994, pp. 216-233.

M. Bellare and S. Micali, "How to Sign Given Any Trapdoor Permutation," *J. of the Assoc. for Computing Machinery*, vol. 39, No. 1, Jan. 1992, pp. 214-233.

J. C. Benaloh, "Secret Sharing Homomorphisms: Keeping Shares of a Secret Secret (Extended Abstract)," *Proc. of Advances in Cryptology—CRYPTO '86*, Lecture Notes in Computer Science 263, Springer-Verlag, 1986, pp. 216-233.

W. Johnston, et al., "Authorization and Attribute Certificates for Widely Distributed Access Control," *IEEE 7th International Workshops on Enabling Technologies: Infrastructure for Collaborative Enterprises*, 1998, 6 pp.

P. Janson and M. Waidner, "Electronic Payment over Open Networks," *IBM Zurich Research Laboratory*, Apr. 18, 1995, 9 pp.

E. D. Karnin, et al., "On Secret Sharing Systems," *IEEE Transactions on Information Theory*, vol. IT-29, No. 1, Jan. 1983, pp. 35-41.

S. Micali, and R. L. Rivest, R. L., "Micropayments Revisited," *Proc. of the the Cryptographer's Track At the RSA Conference on Topics in Cryptology* (Feb. 18-22, 2002), Lecture Notes In Computer Science 2271. Springer-Verlag, London, 2002, 149-163.

Silvio Micali, "Enhanced Certificate Revocation," *Technical Memo MIT/LCS/TM-542b, Laboratory for Computer Science, Massachusetts Institute of Technology*, Mar. 22, 1996, 10 pp.

R. Housley, et al., "Internet Public Key Infrastructure Part I: x.509 Certificate and CRL Profile," *Internet Engineering Task Force, PKIX Working Group, Internet Draft*, Mar. 26, 1996, 76 pp.

T. Elgamal, et al., "Securing Communications on the Intranet and Over the Internet," White Paper, *Netscape Communications Corporation*, Jul. 1996, 19 pp.

S. Berkovits, et al., "Public Key Infrastructure Study," Final Report, *National Institute of Standards and Technology*, Gaithersburg, MD, Apr. 1994, 193 pp.

M. Ben-Or, et al., "Completeness Theorems for Non-Cryptographic Fault-Tolerant Distributed Computation," ACM-0-89791-264, 1988, 10 pp.

M. Ben-Or, et al., "A Fair Protocol for Signing Contracts," *IEEE Transactions on Information Theory*, vol. 36, No. 1, Jan. 1990, pp. 40-46.

G. R. Blakley, "Safeguarding cryptographic keys," *AFIPS—Proc. of the National Computer Conference*, vol. 48, 1979, pp. 313-317.

J. Camenisch, et al., "An Efficient Fair Payment System," ACM-089791-892-0, 1996, 7 pp.

J. Camenisch, et al., "Digital Payment Systems with Passive Anonymity-Revoking Trustees," *Computer Security—ESORICS '96*, Lecure Notes in Computer Science 1146, Springer Verlag, 1996, pp. 33-43.

M. Blum, "How to Exchange (Secret) Keys," *ACM Transactions on Computer Systems*, vol. 1, No. 2, May 1983, pp. 175-193.

H. Bürk, et al., "Digital Payment Systems Enabling Security and Unobservability," *Computers & Security*, vol. 8, Elsevier Science, 1989, pp. 399-416.

G. Brassard, et al., "Minimum Disclosure Proofs of Knowledge," *J. of Computer and System Sciences*, vol. 37, 1988, pp. 156-189.

D. Chaum, et al., "Untraceable Electronic Cash," *Proc. of the 8th Annual international Cryptology Conference on Proc. of Advances in Cryptology* (Aug. 21-25, 1988), Lecture Notes In Computer Science 403, Springer-Verlag, 1990, pp. 319-327.

P. Cheng, et al., "Design and Implementation of Modular Key Management Protocol and IP Secure Tunnel on AIX," *IBM Thomas J. Watson Research Center, Yorktown Heights, NY, 10598*, Apr. 28, 1995, 14 pp.

R. DeMillo, et al., "Protocols for Data Security," *Computer, IEEE*, Feb. 1983, pp. 39-50.

E-mail from Martin Hellman, "Re: Clipper-Chip Escrow-System Flaws," Apr. 16, 1993, 1 p.

E-mail from Martin Hellman, "Clipper Chip," Apr. 17, 1993, 2 pp.

E-mail from Dorothy Denning, "Re: Clipper Chip," Apr. 18, 1993, 3 pp.

Y. Desmedt, et al., "Threshold cryptosystems," *Proc. of Advances in Cryptology—CRYPTO 89*, Lecture Notes in Computer Science 435, Springer-Verlag, 1990, pp. 307-315.

W. Diffie, et al., "New Directions in Cryptography," *IEEE Transactions on Information Theory*, vol. IT-22, Nov. 1976, pp. 644-654.

S. Dukach, "SNPP: A Simple Network Payment Protocol," *Proc. of the Eighth Annual Computer Security Applications Conference*, Dec. 1992, 6 pp.

S. Even, et al., "A Randomized Protocol for Signing Contracts," *Communications of the ACM, Programming Techniques and Data Structures*, vol. 28, No. 6, Jun. 1985, pp. 637-647.

S. Even, et al., "On-line/Off-line Digital Signatures," *Proc. of Advances in Cryptology*, Springer-Verlag New York, pp. 263-275, year of publication: 1989.

S. Even, et al., "Secure Off-line Electronic Fund Transfer Between Nontrusting Parties," *Computer Science Department, Technion, Israel Institute of Technology, Haifa, Israel 32000*, Jan. 31, 1988, 10 pp.

O. Goldreich, et al., "Proofs that Yield Nothing But their Validity and a Methodology of Cryptographic Protocol Design," *Proc. of 27th Symp. on Foundation of Computer Science*, 1986, pp. 174-187.

P. Feldman, "A Practical Scheme for Non-interactive Verifiable Secret Sharing," *IEEE Symposium on Foundations of Computer Science*, 1987, pp. 427-437.

A. Fiat, "Batch RSA," *Proc. of Advances in Cryptology—CRYPTO '89*, Lecture Notes on Computer Science 435, Springer-Verlag, 1989, pp. 175-185.

S. Goldwasser, et al., "A Digital Signature Scheme Secure Against Adaptive Chosen-Message Attacks," *Society for Industrial and Applied Mathematics (SIAM) J. Comput.*, vol. 17, No. 2, Apr. 1988, pp. 281-308.

L. C. Guillou, et al., "A 'Paradoxical' Identity-Based Signature Scheme Resulting from Zero-Knowledge," *Proc. of Advances in Cryptology—CRYPTO '88*, Lecture Notes in Computer Sciences 403, Springer Verlag, New York, 1990, pp. 216-231.

K. E. B. Hickman, "The SSL Protocol," Internet Draft, *Netscape Communications Corporation*, Jun. 1995, 32 pp.

M. Jakobsson, "Reducing costs in identification protocols," *Department of Computer Science and Engineering, University of California, San Diego, La Jolla, CA 92093*, 1992, 7 pp.

G. B. Koleta, "Cryptographers Gather to Discuss Research: Analyses of how to break codes and new ways to use codes were featured at the meeting," *Science*, vol. 214, Nov. 6, 1981, pp. 646-647.

P. Janson, et al., "Electronic Payment Systems," *ACTS Project AC026, SEMPER*, May 1, 1996, pp. 24 pp.

J. Kilian, et al., "Identify Escrow," *Proc. of Advances in Cryptology—CRYPTO '98*, 1998, 18 pp.

A. G. Konheim, "Chapter IX: Digital Signatures and Authentications," *Cryptography, A Primer*, John Wiley & Sons, 1981, pp. 331-347, 365-370.

H. Königs, "Cryptographic Identification Methods for Smart Cards in the Process of Standardization," *IEEE Communications Magazine*, Jun. 1991, pp. 42-47.

S. Low, et al., "Anonymous Credit Cards," *Proc. of the $2^{nd}$ ACM Conference on Computer and Communications, Fairfax, Virginia*, 1994, 10 pp.

M. Luby, et al., "How to Simultaneously Exchange a Secret Bit by Flipping a Symmetrically-Biased Coin," *Proc. of the 24th IEEE Symposium on Foundations of Computer Science, Tucson, Arizona*, 1983, pp. 11-21.

J. Markoff, "New Communication System Stirs Talk of Privacy vs. Eavesdropping," *The New York Times*, Apr. 16, 1993, 2 pp.

J. Markoff, "Communications Plan Draws Mixed Reaction," *The New York Times*, Apr. 17, 1983, 1 pp.

T. Leighton and S. Micali, "New Approaches to Secret-Key Exchange," *Proc. of Advances in Cryptology—CRYPTO '93*, 1993, 10 pp.

A. J. Menezes, Handbook of Applied Cryptography, CRC Press, 1997, pp. 566, 576-577, 588-589, 706, 716, 720, 728-729, 737.

P. D. Merillat, "Secure stand Alone Positive Personnel Identify Verification System (SSA-PPIV)," Sandia Laboratories, SAND79-0070, Mar. 1979, 21 pp.

R. C. Merkle, "A Certified Digital Signature," *Communications of the ACM*, 1979, pp. 218-238.

R. C. Merkle, "A Digital Signature Based on a Conventional Encryption Function," *Presented at CRYPTO '87*, 1987, 8 pp.

C. H. Meyer and S. M. Matyas, "Chapter 8: Authentication Techniques Using Cryptography," *Cryptography: A New Dimension in Computer Data Security*, John Wiley & Sons, 1982, pp. 350-428.

S. Micali and A. Shamir, "An Improvement of The Fiat-Shamir Identification And Signature Scheme," *Presented at CRYPTO '88*, 1988, 5 pp.

S. Micali, "Guaranteed partial key escrow," *Technical Memo, MIT/LCS TM-537*, Sep. 1995, 13 pp.

S. Micali and A. Shamir, "Partial Key-Escrow," *MIT Laboratory for Computer Science, Cambridge, MA 02139 and Weizmann Institute Computer Science Department, Rehovot, Israel*, Feb. 1996, 13 pp.

S. Micali, "Fair Cryptosystems," *Technical Memo, MIT/LCS TM-579.b*, Nov. 1993, 36 pp.

Website pages @ http://www.valicert.com, Sep. 23, 2002, 8 pp.

T. P. Pedersen, "Electronic payments of small amounts," *Technical report, Aarhus University, Computer Science Department*, Aug. 1995, 12 pp.

T. P. Pedersen, "Distributed Provers with Applications to Undeniable Signatures," *Proc. of Advances in Cryptology—EUROCRYPT '91*, Lecture Notes in Computer Science 547, Springer-Verlag, 1991, pp. 221-242.

Donn B. Parker, "Chapter 43: Public Key Cryptosystems," *Fighting Computer Crime*, Charles Scribner's Sons, New York, 1983, pp. 327-334.

John Droge, "Mykotronx Develops New Chip to Protect Digital Data," Press Release, Mykotronx, Inc., Torrence, California, 1992, 3 pp.

Barbara Fox, "Certificate Revocation: Mechanics and Meaning," *Microsoft Corporation, Introductory Remarks for Panel Discussion with J. Feigenbaum, P. Kocher, M. Myers and R. Rivest,*, 1998, 8 pp.

David Mutch, "Electronics Industry Wants to Offer V-Chip of Its Own," *The Christian Science Monitor*, Sep. 25, 1995, 3 pp.

S. Micali and P. Rogaway, "Secure Computation," *Proc. of Advances in Cryptology: CRYPTO '91*, Lecture Notes in Computer Science 576, Springer, 1991, pp. 392-404.

C. Mueller-Scholor and N. R. Wagner, "The implementation of a cryptography-based secure office system," *AFIPS Proc. of the National Computer Conference*, 1982, pp. 487-492.

M. Noar and M. Yung, "Universal One-Way Hash Function and their Cryptographic Applications," ACM 0-89791-307-8, 1989, pp. 33-43.

R. M. Needham and M. D. Schroeder, "Using Encryption for Authentication in Large Networks of Computers," *Communications of the ACM, Operating Systems*, vol. 21, No. 12, Dec. 1978, pp. 993-999.

H. Ong and C.P. Schnorr, "Fast Signature Generation with a Fiat-Shamir-Like Scheme," *Proc. of Advances in Cryptology—EUROCRYPT '90*, Lecture Notes in Computer Science 473, Springer-Verlag, 1991, pp. 432-440.

M. O. Rabin, "Digitalized Signatures and Public-Key Functions as Intractable as Factorization," Technical Report, MIT/LCS/TR-212, Jan. 1979, 17 pp.

T. Rabin and M. Ben-Or, "Verifiable Secret Sharing and Multiparty Protocols with Honest Majority," ACM 0-89791-307-8, 1989, pp. 73-85.

M. O. Rabin, "Transaction Protection By Beacons," Harvard University Center for Research in Computing Technology, TR-29-81, Nov. 1981, 21 pp.

Michael O. Rabin, "How to Exchange Secrets," May 20, 1981, 21 pp.

E. Rescorla and A. Schiffman, "The Secure HyperText Transfer Protocol," Internet Draft, *Web Transaction Security Working Group, Enterprise Integration Technologies*, Jul. 1995, 36 pp.

K. Rihaczek, "Teletrust," *Computer Networks and ISDN Systems*, vol. 13, 1987, pp. 235-239.

"Statement by the Press Secretary," *The White House, Office of the Press Secretary*, Apr. 16, 1993. 6 pp.

C. P. Schnorr, "Efficient Identification and Signatures for Smart Cards," *Proc. of Advances in Cryptology—Crypto 89*, G. Brassard (ed.), Lecture Notes in Computer Science 435, Springer-Verlag, 1990, pp. 239-251.

J. M. Blachere and M. Waidner, "SEMPER," *Project AC026*, Document 431ZR031, 1995, 46 pp.

Bob Serenelli and Tim Leisher, "Securing Electronic Mail Systems," *Communications—Fusing Command, Control and Intelligence, MILCOM '92*, Conference Record, vol. 2, 1992, pp. 677-680.

A. Shamir, "How to Share a Secret," *Programming Techniques, Communications of the ACM*, vol. 22, No. 11, Nov. 1979, pp. 612-613.

A. Shamir, "Identity-based cryptosystems and signature schemes," *Proc. of Advances in Cryptology, CRYPTO 84*, G. R. Blakley and D. Chaum (Eds.), Springer-Verlag, 1985, pp. 47-53.

*Contemporary Cryptology*, G. J. Simmons (Ed.), IEEE Press, New York, 1991, pp. 348-350, 617-630.

G. J. Simmons, "How to (Really) Share a Secret," *Proc. of Advances in Cryptology—Crypto 88*, S. Goldwasser (ed.), Lecture Notes in Computer Science 403, Springer-Verlag, 1988, pp. 390-448.

G. J. Simmons, "An Impersonation-Proof Identify Verification Scheme," *Proc. of Advances in Cryptology—Crypto 87*, C. Pomerance (Ed.), Lecture Notes in Computer Science 293, Springer-Verlag, 1987, pp. 211-215.

G. J. Simmons, "A Protocol to Provide Verifiable Proof of Identity and Unforgeable Transaction Receipts," IEEE Journal on Selected Areas in Communications, vol. 7, No. 4, May 1989, pp. 435-447.

G. J. Simmons, "Scanning the Issue," and "How to Insure that Data Acquired to Verify Treaty Compliance are Trustworthy," *Proc. of the IEEE*, vol. 76, No. 5, May 1988, pp. 515-518 and 621-627.

G. J. Simmons, "A System for Verifying User Identity and Authorization at the Point-of Sale or Access," Cryptologia, vol. 8, No. 1, Jan. 1984, 21 pp.

G. J. Simmons and G. B. Purdy, "Zero-Knowledge Proofs of Identity and Veracity of Transaction Receipts," *Proc. of Advances in Cryptology—Eurocrypt'88*, Lecture Notes in Computer Science 330, C. G. Günther (Ed.), Springer-Verlag New York, 1988, pp. 35-49.

M. Sirbu and J. D. Tygar, "NetBill: An Internet Commerce System Optimized for Network Delivered Services," *IEEE Personal Communications*, Aug. 1995, 13 pp.

J. L. Snare, "Secure Electronic Data Interchange," *Computer Security in the Age of Information*, W. J. Caelli (Ed.), Elsevier Science Publishers B.V., 1989, pp. 331-342.

K. R. Sollins, "Cascaded Authentication," *Proc. of the 1988 IEEE Symposium on Security and Privacy*, 1988, pp. 156-163.

M. Stadler, et al., "Fair Blind Signatures," *Proc. of Advances in Cryptology—Eurocrypt '95*, Lecture Notes in Computer Science 921, Springer-Verlag, 1995, pp. 209-219.

L. H. Stein, et al., "The Green Commerce Model," Internet Draft, Oct. 1994, 18 pp.

G. Tsudik, "Zurich iKP Prototype (ZiP): Protocol Specification Document," *IBM Zurich Research Lab*, Mar. 5, 1996, 30 pp.

V. Varadharajan and S. Black, "Formal Specification of a Secure Distributed Messaging System," *Proc. of the 12th National Computer Security Conference*, Oct. 1989, pp. 146-171.

M. Waidner, "Development of a Secure Electronic Marketplace for Europe," *Proc. of ESORICS 96*, Rome, Sep. 1996, 15 pp.

M. Wegman, "One-Time Pad Digitial Signature Technique," *IBM Technical Disclosure Bulletin*, vol. 21, No. 3, Aug. 1978, pp. 1316-1318.

H. C. Williams, "A Modification of the RSA Public-Key Encryption Procedure," *IEEE Transactions on Information Theory*, vol. IT-26, No. 6, Nov. 1980, pp. 726-729.

A. C. Yao, "Protocols for Secure Computations," *Proc. of the 23rd Symp. on Foundation of Computer Science*, IEEE, 1982, pp. 160-164.

J. Zhou and D. Gollman, "A Fair Non-repudiation Protocol," *Proc. of the 1996 IEEE Symposium on Security and Privacy*, 1996, pp. 55-61.

* cited by examiner

US 7,660,994 B2

ACCESS CONTROL

CROSS-REFERENCE TO RELATED APPLICATIONS

This application claims priority to U.S. provisional patent application No. 60/482,179 filed on Jun. 24, 2003, which is incorporated by reference herein, and is a continuation-in-part of U.S. patent application Ser. No. 09/915,180 filed on Jul. 25, 2001 now U.S. Pat. No. 6,766,450, which is a continuation of is a continuation of U.S. patent application Ser. No. 09/483,125 filed Jan. 14, 2000 (now U.S. Pat. No. 6,292,893), which is a continuation of U.S. patent application Ser. No. 09/356,745 filed Jul. 19, 1999 (abandoned), which is a continuation of U.S. patent application Ser. No. 08/823,354 filed Mar. 24, 1997 (now U.S. Pat. No. 5,960,083), which is a continuation of U.S. patent application Ser. No. 08/559,533 filed Nov. 16, 1995 (now U.S. Pat. No. 5,666,416) which claims priority to U.S. provisional patent application Ser. No. 60/006,038 filed on Oct. 24, 1995.

BACKGROUND OF THE INVENTION

1. Technical Field

This application relates to the field of security, and more particularly to the field of security for computers and related items.

2. Description of Related Art

Corporate desktop and laptop computers often contain sensitive information that should not be exposed outside of the company. Boot and Login passwords along with the encrypting file system of recent versions of Microsoft operating systems can sometimes protect laptop data in the event of computer theft, but such features are often left unused because of configuration difficulties and IT maintenance hassles. Furthermore, the most serious threat of computer and data theft comes not from random airport thieves, but from disgruntled or recently terminated employees. There is no current technology in place to prevent terminated employees from accessing all corporate data still stored on their laptops or home computers.

It is desirable to provide a solution that addresses the these difficulties in a way that does not require additional extraordinary security measures or procedures, especially in the case of laptop computers, which may be legitimately operated far from corporate IT facilities that manage the laptops.

SUMMARY OF THE INVENTION

According to the present invention, at least one administration entity controls access to an electronic device by the at least one administration entity generating credentials and a plurality of corresponding proofs for the electronic device, wherein no valid proofs are determinable given only the credentials and values for expired proofs, the electronic device receiving the credentials, if access is authorized at a particular time, the electronic device receiving a proof corresponding to the particular time, and the electronic device confirming the proof using the credentials. The at least one administration entity may generate proofs after generating the credentials. A single administration entity may generate the credentials and generate the proofs. There may be a first administration entity that generates the credentials and other administration entities that generate proofs. The first administration entity may also generate proofs or may not. The credentials may be a digital certificate that includes a final value that is a result of applying a one way function to a first one of the proofs. Each of the proofs may be a result of applying a one way function to of a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer, which may boot up only if access is authorized. The electronic device may be a disk drive. At least one administration entity controlling access to an electronic device may include providing proofs using at least one proof distribution entity separate from the at least one administrative entity. There may be a single proof distribution entity or a plurality of proof distribution entities. At least one administration entity controlling access to an electronic device may include providing proofs using a connection to the electronic device. The connection may be the Internet. At least some of the proofs may be stored locally on the electronic device. At least one administration entity controlling access to an electronic device may include, if the proof corresponding to the time is not available locally, the electronic device requesting the proofs via an external connection. Each of the proofs may be associated with a particular time interval. After a particular time interval associated with a particular one of the proofs has passed, the electronic device may receive a new proof. The time interval may be one day.

According further to the present invention, an electronic device controls access thereto by receiving credentials and at least one of a plurality of corresponding proofs for the electronic device, wherein no valid proofs are determinable given only the credentials and values for expired proofs and testing the at least one of a plurality of proofs using the credentials. The credentials may be a digital certificate that includes a final value that is a result of applying a one way function to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer. An electronic device controlling access thereto may also include the computer booting up only if access is authorized. The electronic device may be a disk drive. An electronic device controlling access thereto may also include obtaining proofs using a connection to the electronic device. The connection may be the Internet. At least some of the proofs may be stored locally on the electronic device. An electronic device controlling access thereto may also include, if the proof corresponding to the time is not available locally, the electronic device requesting the proofs via an external connection. Each of the proofs may be associated with a particular time interval. After a particular time interval associated with a particular one of the proofs has passed, the electronic device may receive a new proof. The time interval may be one day.

According further to the present invention, controlling access to an electronic device includes providing credentials to the electronic device and, if access is allowed at a particular time, providing a proof to the electronic device corresponding to the particular time, wherein the proof is not determinable given only the credentials and values for expired proofs. The credentials may be a digital certificate that includes a final value that is a result of applying a one way function to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer. Controlling access to an electronic device may include the computer booting up only if access is authorized. The electronic device may be a disk drive. Controlling access to an electronic device may include providing proofs using at least one proof distribution entity separate from the at least one administrative entity. There may be a single proof distribution entity. There may be a plurality of proof distribution entities. Controlling access to an electronic device may include providing proofs using a connection to the electronic device. The connection may be the Internet. At least some of the proofs may be stored locally on the electronic device. Controlling access to an electronic device may include, if the proof corresponding to the time is not available locally, the electronic device requesting the proofs via an external connection. Each of the proofs may be associated with a particular time interval. After a particular time interval associated with a particular one of the proofs has passed, the electronic device may receive a new proof. The time interval may be one day.

The present invention provides a solution that virtually guarantees that access to all corporate computers (office, remote and even disconnected laptops) be limited to currently authorized employees. A terminated employee will be unable to log in to his or her computer either immediately or within hours of losing authorization—even if that laptop is kept at home and not connected to the network. The added security can be made completely invisible to legitimate users. The present invention may provide seamless integration with existing Windows login management infrastructure and may be invisible to end users under normal operation. Access revocation to a particular computer may not require any network connection works with all disconnected computers. An administrator may set scheduled access rights by user or group. The present invention may provide easy recovery from inadvertent shut-outs.

The present invention provides massive scalability (on the order of hundreds of millions or more users). The present invention does not require secure distributed servers (since the issued proofs can be stored and distributed to unsecured computers), which can save significantly over the costs of a traditional large-scale security system. The present invention provides fast response time on average because the validation operation takes no time at log-in when the proofs are already stored locally and because retrieving a proof from the network is a sub-second operation almost everywhere in the world. The present invention also provides for minimal connectivity requirements since an electronic device using the invention may only need to receive a twenty-byte proof once every time-interval via any non-secure method. All wired and wireless connections are acceptable as well as SMS, pagers, IR, FM radio, cell phones, etc. Once an electronic device is reported stolen, it does not need to connect to any network to be revoked. The present invention also provides enhanced security because the proofs are integrity protected and unforgeable, the responders don't contain any sensitive code or data, and the distribution system is massively distributed.

These factors make the system very robust and protect against the vast majority of spoofing, hacking and denial of service attacks.

DETAILED DESCRIPTION OF VARIOUS EMBODIMENTS

Figure 1A:
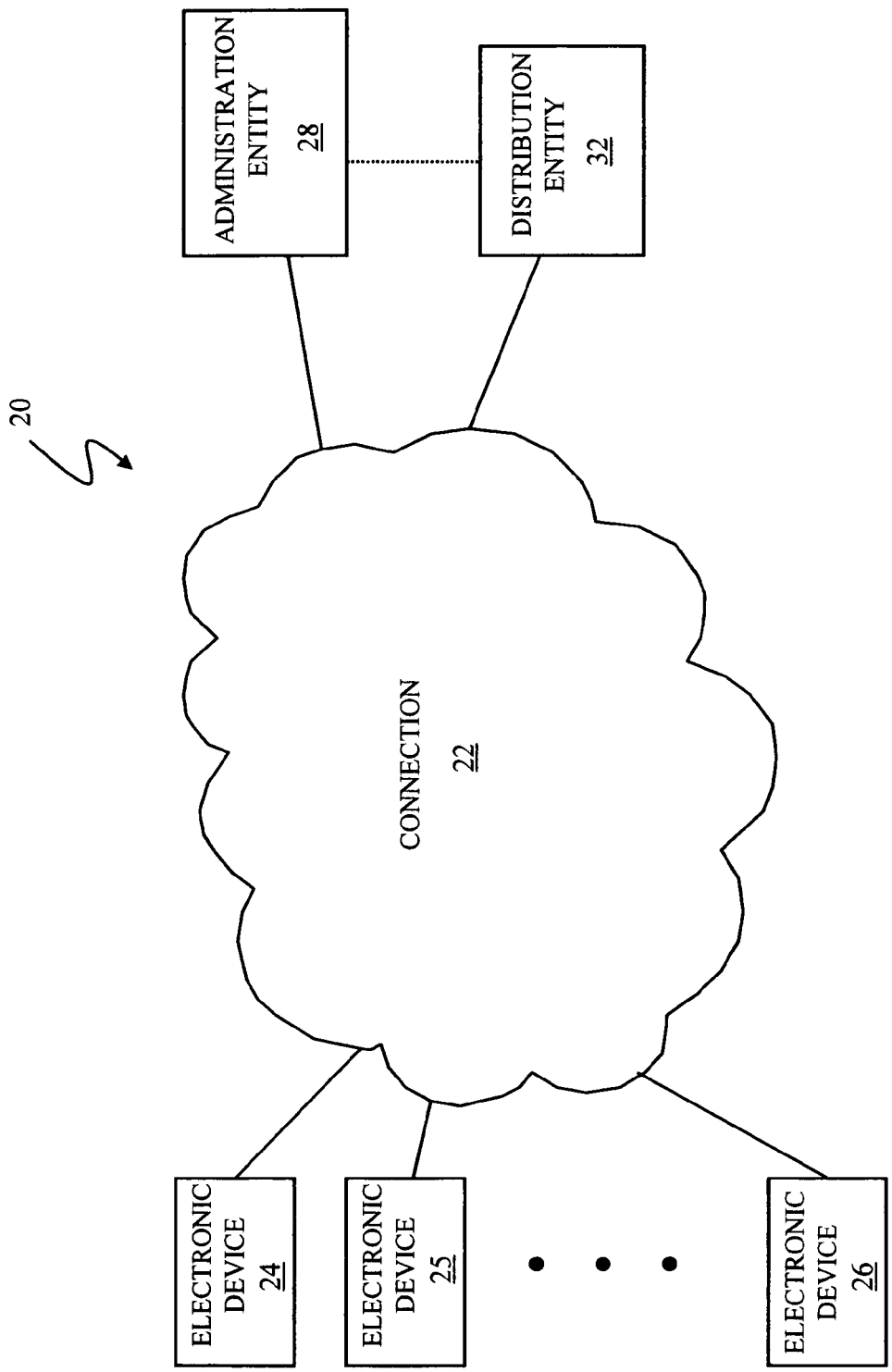
FIG. 1A is a diagram illustrating an embodiment that includes a connection, a plurality of electronic devices, an administration entity, and a proof distribution entity according to the system described herein.

Referring to FIG. 1A, a diagram 20 illustrates a general connection 22 having a plurality of electronic devices 24-26 coupled thereto. Although the diagram 20 shows three electronic devices 24-26, the system described herein may work with any number of electronic devices. The connection 22 may be implemented by a direct electronic data connection, a connection through telephone lines, a LAN, a WAN, the Internet, a virtual private network, or any other mechanism for providing data communication. The electronic devices 24-26 may represent one or more laptop computers, desktop computers (in an office or at an employees home or other location), PDA's, cellular telephones, disk drives, mass storage devices, or any other electronic devices in which it may be useful to restrict access thereto. In an embodiment herein, the electronic devices 24-26 represent desktop or laptop computers that are used by employees of an organization that wishes to restrict access thereto in case a user/employee leaves the organization and/or one of the computers is lost or stolen. Of course, there may be other reasons to restrict access to one or more of the electronic devices 24-26 and the system described herein may be used in connection with any appropriate implementation.

An administration entity 28 sets a policy for allowing access by users to the electronic devices 24-26. For example, the administration entity 28 may determine that a particular user, U1, may no longer have access to any of the electronic devices 24-26 while another user U2, may access the electronic device 24 but not to the other electronic devices 25, 26. The administrative entity 28 may use any policy for setting user access.

The administrative entity 28 provides a plurality of proofs that are transmitted to the electronic devices 24-26 via the connection 22. The proofs may be provided to the electronic devices 24-26 by other means, which are discussed in more detail below. The electronic devices 24-26 receive the distributed proofs and, using credentials stored internally (described in more detail elsewhere herein), determine if access thereto should be allowed. Optionally, a proof distribution entity 32 may also be coupled to the connection 22 and to the administration entity 28. The proof distribution entity 32 provides proofs to the electronic devices 24-26. In an embodiment herein, a proof would only be effective for one user and one of the electronic devices 24-26 and, optionally, only for a certain date or range of dates.

The proofs may be provided using a mechanism like that disclosed in U.S. Pat. No. 5,666,416, which is incorporated by reference herein, where each of the electronic devices 24-26 receives, as credentials, a digital certificate signed by the administrative entity 28 (or other authorized entity) where the digital certificate contains a special value representing an initial value having a one way function applied thereto N times. At each new time interval, the electronic devices may be presented with a proof that consists of a one of the values in the set of N values obtained by the applying the one way function. In such a case, the electronic devices 24-26 may confirm that the proof is legitimate by applying the one way function a number of times to obtain the special value provided in the digital certificate. This and other possible mechanisms are described in more detail elsewhere herein.

It is also possible to use one or more of the products provided by CoreStreet, Ltd. Of Cambridge, Mass. to provide the appropriate credentials and proofs as set forth herein or use any other mechanism for generating unique proofs that 1) could only have been generated by an administrative authority (absent an administrative security breech); and 2) can not be used to generate any other proofs. Accordingly, the proofs are such that, given a legitimate proof P1, an unauthorized user may not generate another seemingly legitimate proof P2 for a different purpose (e.g., for a different time interval, different device, etc.). Thus, issued proofs may be stored and distributed in an unsecure manner, which substantially reduces the costs associated with the system. Of course, it is advantageous to maintain proper security for the entity or entities that generate the credentials and/or proofs as well as maintaining appropriate security for any unissued (e.g., future) proofs.

In addition, an unauthorized user in possession of legitimate proofs P1-PN may not generate a new proof PN+1. This is advantageous in a number of instances. For example, a terminated employee may not himself generate new proofs to provide unauthorized access to his corporate laptop after termination even though he is still in possession of all of the previous legitimate proofs he used for the laptop while he was still employed by the corporation.

In an embodiment herein, the electronic devices 24-26 are computers having firmware and/or operating system software that performs the processing described herein where the proofs are used to prevent unauthorized login and/or access thereto. Upon booting up and/or after a sufficient amount of time has passed, the computers would require an appropriate proof in order to operate. In this embodiment, functionality described herein may be integrated with the standard Windows login system (as well as BIOS or PXE environments). The administration entity 28 may be integrated with the normal user-administration tools of corporate Microsoft networks and to allow administrators to set login policies for each user. In many cases, the administration entity 28 may be able to derive all needed information from existing administrative information making this new functionality almost transparent to the administrator and reducing training and adoption costs. The administration entity 28 may run within a corporate network or be hosted as an ASP model by a laptop manufacturer, BIOS maker or other trusted partner. The proof distribution entity 32 may run partially within the corporate network and partially at a global site. Since proofs are not sensitive information, globally-accessible repositories of the proof distribution system may run as web services, thereby making the proofs available to users outside of their corporate networks.

In an embodiment herein, each of the computers would require a new proof each day. However, it will be appreciated by one of ordinary skill in the art that the time increment may be changed so that, for example, the computers may require a new proof every week or require a new proof every hour.

In addition, it is also possible to take advantage of a little-used feature of IDE hard drives which allows setting of a password on a drive which must be presented to the drive before it will spin up and allow access to the contents. If the firmware for the drive were modified to use the system described herein, it is possible that access to a hard drive may be restricted so that, for example, it would not be possible to gain access to a computer hard drive even by placing it in a different computer. This feature may be implemented with other types of hard drives.

In other implementations, the system may be used in connection with accessing data files, physical storage volumes, logical volumes, etc. In some instances, such as restricting access to files, it may be useful to provide appropriate modifications to the corresponding operating system.

Figure 1B:
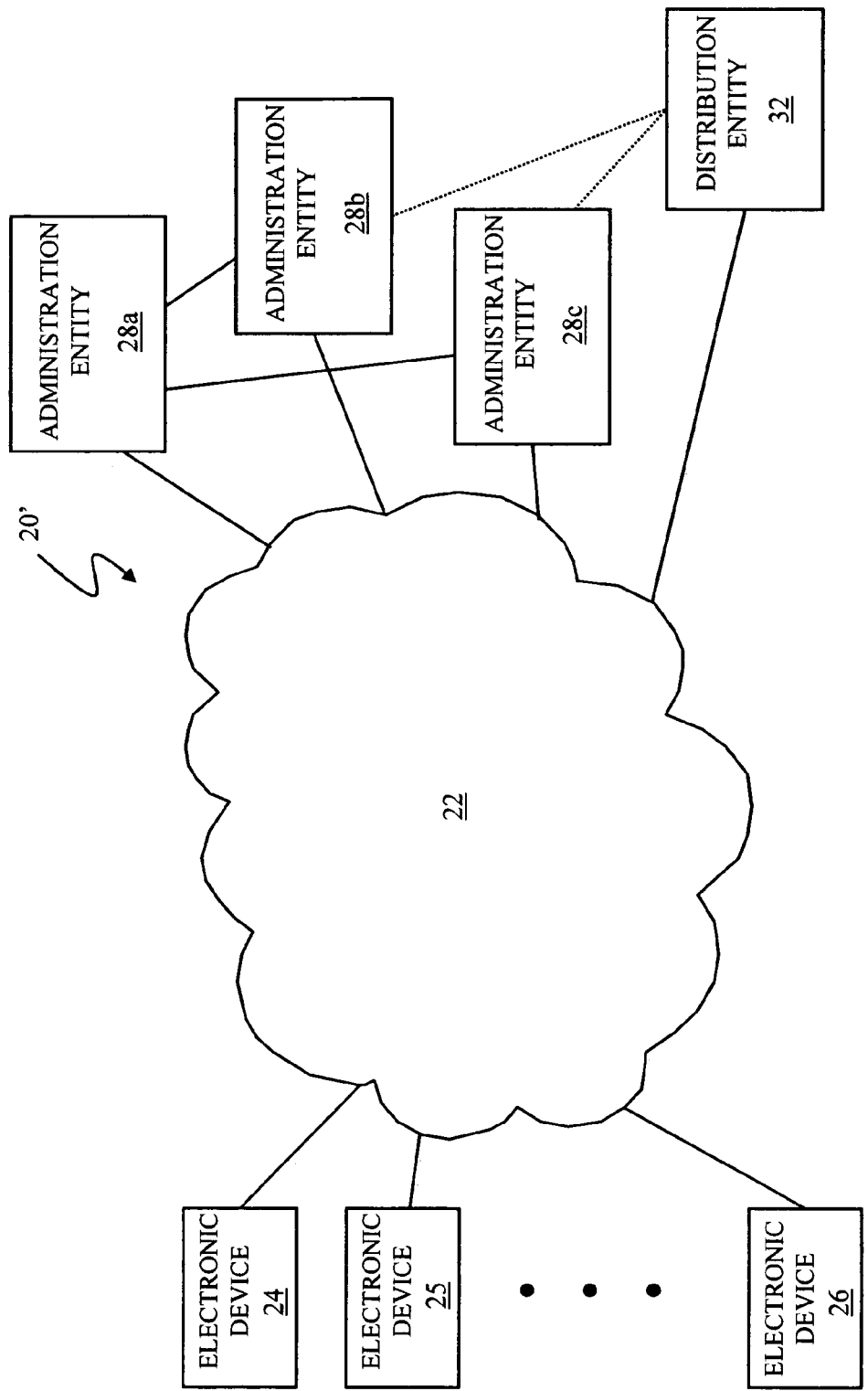
FIG. 1B is a diagram illustrating an alternative embodiment that includes a connection, a plurality of electronic devices, an administration entity, and a proof distribution entity according to the system described herein.

Referring to FIG. 1B, a diagram 20' illustrates an alternative embodiment with a plurality of administrative entities 28a-28c. Although the diagram 20' shows three administrative entities 28a-28c, the system described herein may work with any number of administrative entities. In the embodiment shown by the diagram 20', it is possible for one of the administrative entities 28a-28c (e.g., the administrative entity 28a) to generate the credentials while other ones of the administrative entities 28a-28c (e.g., the administrative entities 28b, 28c) generate the proofs or all of the administrative entities 28a-28c generate the proofs. Optionally, the proof distribution entity 32 may be used.

Figure 1C:
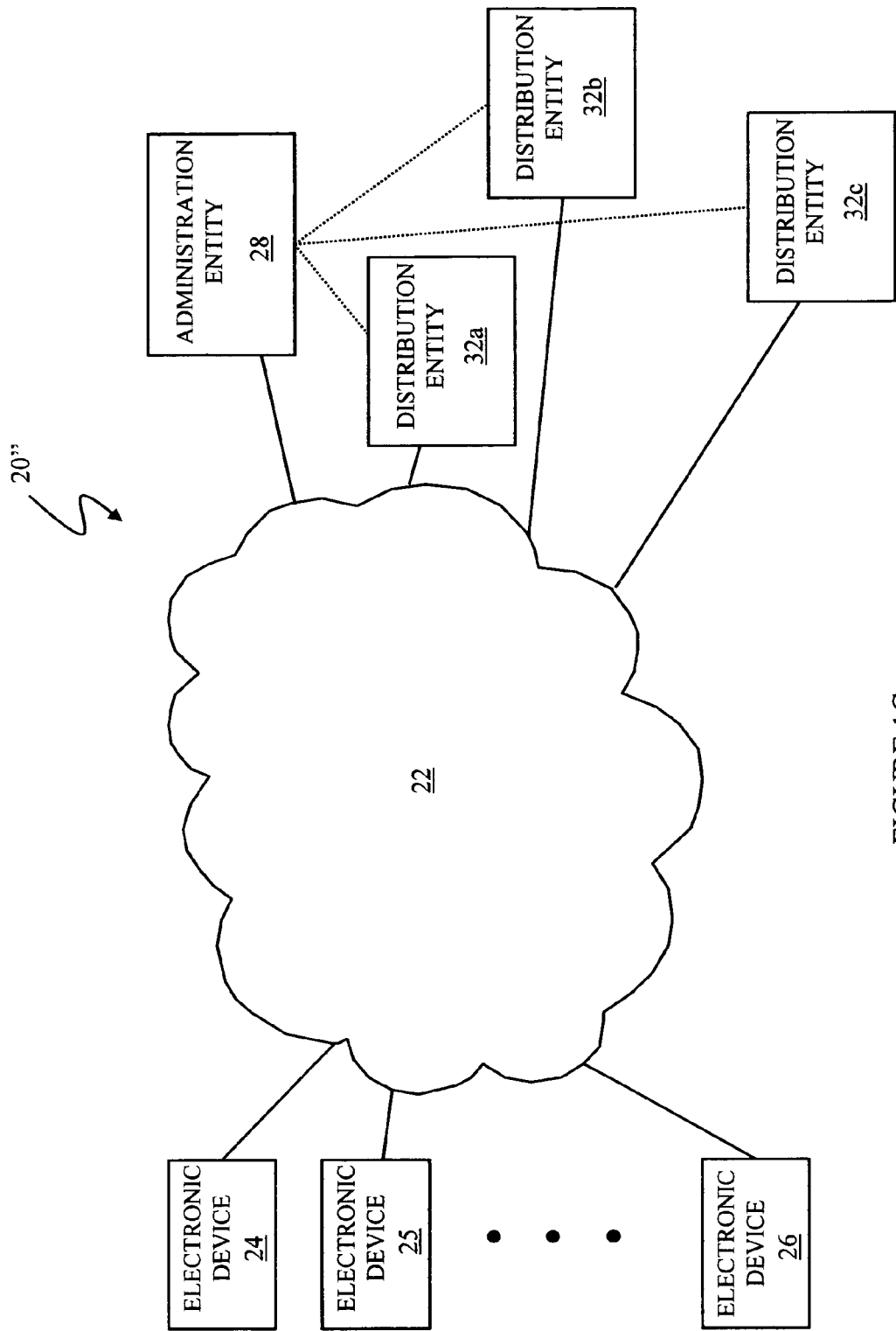
FIG. 1C is a diagram illustrating an alternative embodiment that includes a connection, a plurality of electronic devices, an administration entity, and a proof distribution entity according to the system described herein.

Referring to FIG. 1C, a diagram 20" illustrates an alternative embodiment with a plurality of proof distribution entities 32a-32c. Although the diagram 20" shows three proof distribution entities 32a-32c, the system described herein may work with any number of proof distribution entities. The embodiment shown by the diagram 20" may be implemented using technology provided by Akamai Technologies Incorporated, of Cambridge, Mass.

Figure 1D:
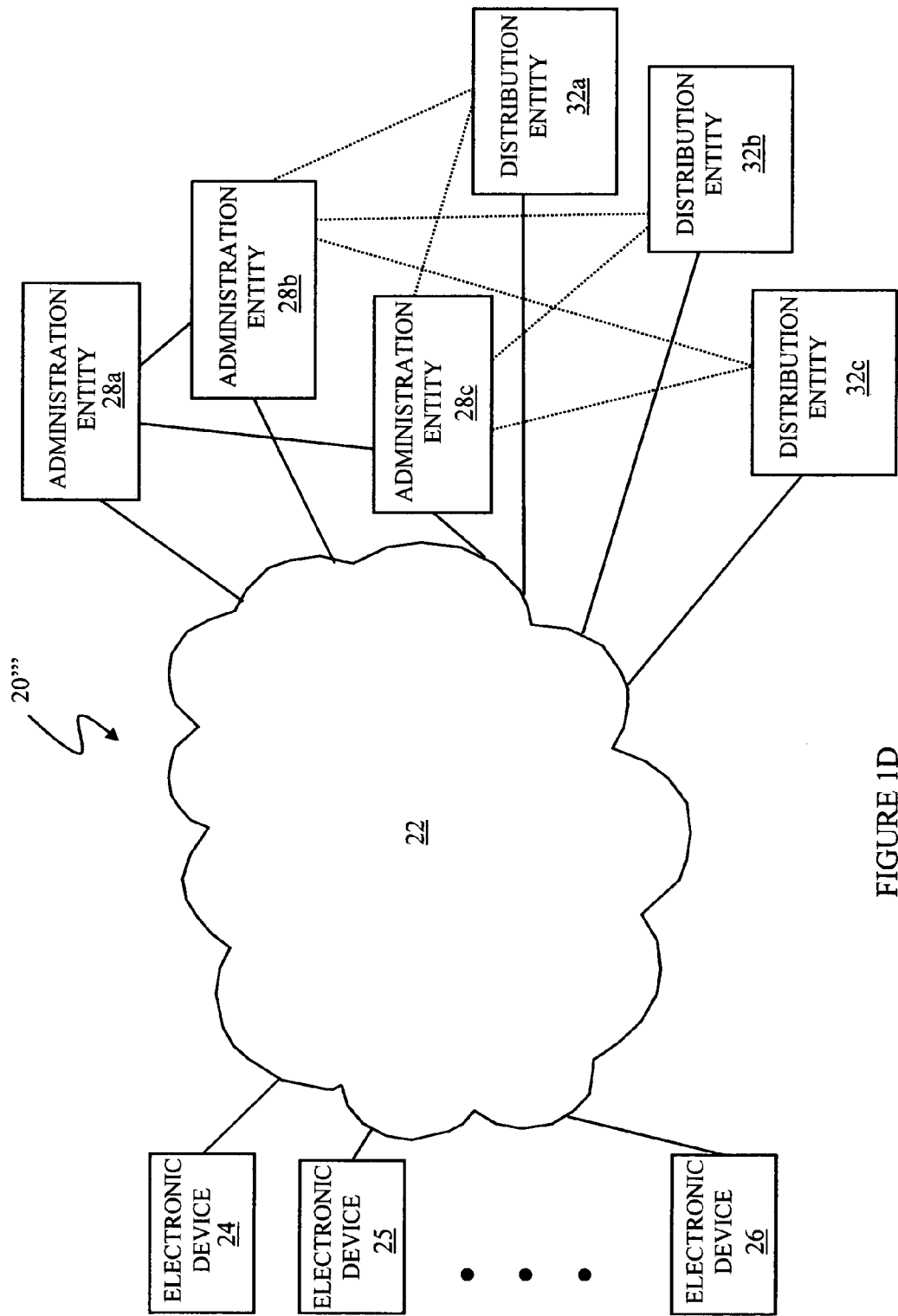
FIG. 1D is a diagram illustrating an alternative embodiment that includes a connection, a plurality of electronic devices, an administration entity, and a proof distribution entity according to the system described herein.

Referring to FIG. 1D, a diagram 20''' illustrates an alternative embodiment with a plurality of administrative entities 28a-28c and a plurality of proof distribution entities 32a-32c. Although the diagram 20''' shows three administration entities 28a-28c and three proof distribution entities 32a-32c, the system described herein may work with any number of administration entities and proof distribution entities. The embodiment shown by the diagram 20''' combines features of the embodiment illustrated by FIG. 1B with features of the embodiment illustrated by FIG. 1C.

Figure 2:
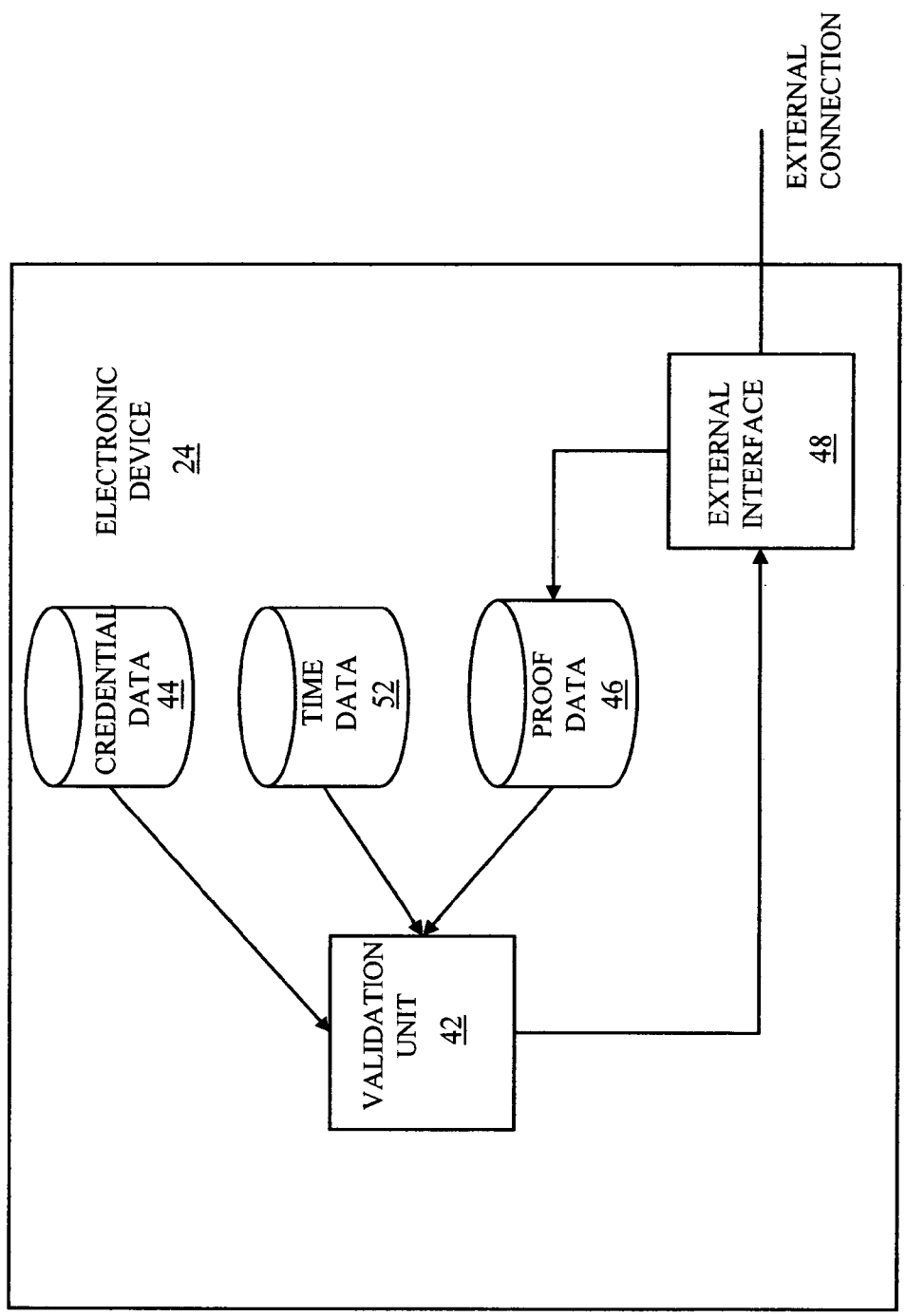
FIG. 2 is a diagram showing an electronic device in more detail according to the system described herein.

Referring to FIG. 2, a diagram illustrates the electronic device 24 in more detail as including a validation unit 42, credential data 44 and proof data 46. The validation unit 42 may be implemented using hardware, software, firmware, or any combination thereof. Upon certain conditions, such as boot up, the validation unit 42 receives a start signal that causes the validation unit 42 to examine the credential data 44 and the proof data 46 and, based on the result thereof, generate a pass signal indicating that a legitimate proof has been presented or otherwise generate a fail signal. The output of the validation unit 42 is used by follow on processing/devices such as computer boot up firmware, to determine whether operation can proceed.

In an embodiment herein, the electronic device 24 includes an external interface 48 which is controlled by the validation unit 42. As with the validation unit 42, the external interface 48 may be implemented using hardware, software, firmware, or any combination thereof. The external interface 48 is coupled to, for example, the connection 22, and is used to fetch new proofs that may be stored in the proof data 46. Thus, if the validation unit 42 determines that the proofs stored in the proof data 46 are not sufficient (e.g., have expired), the validation unit 42 provides a signal to the external interface 48 to cause the external interface 48 request new proofs via the connection 22. Of course, if the electronic 24 has been lost and/or stolen or if the user is a terminated employee or if there is any other reason not to allow access to the electronic device 24, then the external interface 48 will not be able to obtain a valid proof. In some embodiments, the external interface 48 prompts a user to make an appropriate electronic connection (e.g., connect a laptop to a network).

In an embodiment herein, time data 52 provides information to the validation unit 42 to indicate the last time that a valid proof was presented to the validation unit 42. This information may be used to prevent requesting of proof too frequently and, at the same time prevent waiting too long before requesting a new proof. Interaction and use of the validation unit 42, the external interface 48, the credential data 44, the proof data 46, and the time data 52 is described in more detail elsewhere herein.

Figure 3:
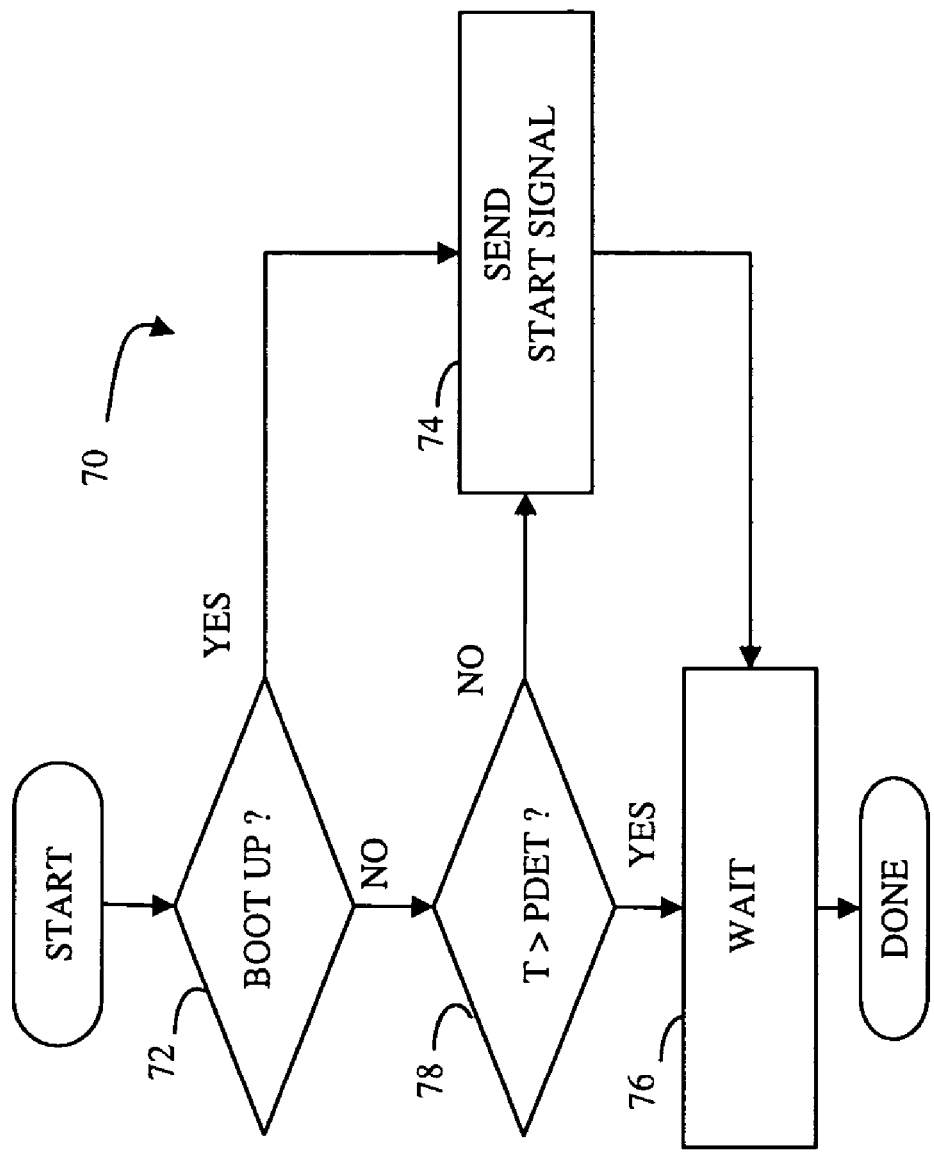
FIG. 3 is a flow chart illustrating steps performed in connection with an electronic device determining whether to perform validation according to the system described herein.

Referring to FIG. 3, a flow chart 70 illustrates steps performed in connection with determining whether to send the start signal to the validation unit 42 to determine if the validation unit 42 should examine the credential data 44 and the proof data 46 to generate a pass or fail signal. Processing begins at a first step 72 where it is determined if a boot up operation is being performed. In an embodiment herein, the proofs are always checked in connection with a boot-up operation. Accordingly, if it is determined at the test step 72 that a boot up is being performed, then control transfers from the step 72 to a step 74 where the start signal is sent to the validation unit 42. Following the step 74 is a step 76 where the process waits predetermined amount of time before cycling again. In an embodiment herein, the predetermined amount of time may be one day, although other amounts of time may also be used. Following step 76, control transfers back to the test step 72, discussed above.

If it is determined at the test step 72 that a boot up operation is not being performed, then control transfers from the test step 72 to a test step 78 where it is determined if the a predetermined amount of time has elapsed since the last running of the validation unit 42. This is determined using the time data element 52 and perhaps the current system time. In an embodiment herein, the predetermined amount of time used at the test step 78 is one day. If it is determined at the test step 78 that the amount of time since the last running of the validation unit 42 is greater than the predetermined amount of time, then control transfers from the test step 78 to the step 74 where the start signal is sent to the validation unit 42. Following the step 74 or following the test step 78 if the amount of time is not greater than the predetermined amount of time, is the step 76, discussed above.

Figure 4:
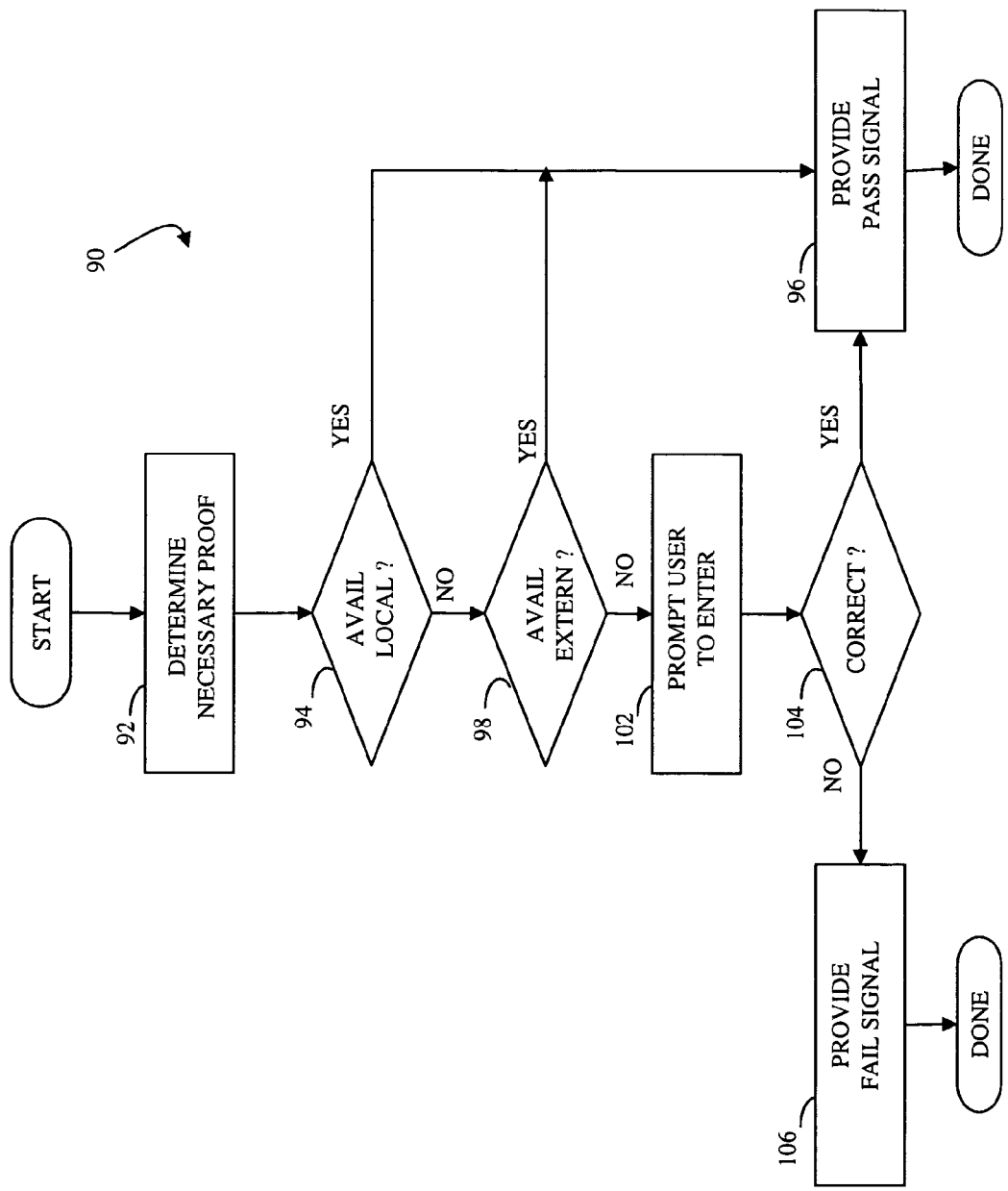
FIG. 4 is a flow chart illustrating steps performed in connection with performing validation according to the system described herein.

Referring to FIG. 4, a flow chart 90 illustrates steps performed in connection with the validation unit 42 determining if a sufficient proof has been received. As discussed elsewhere herein, the validation unit 42 sends either a pass or a fail signal to follow on processing/devices (such as computer boot up firmware or disk drive firmware). Processing begins at a first step 92 where the validation unit 42 determines the necessary proof. The necessary proof is the proof determined by the validation unit 42 sufficient to be able to send a pass signal. The validation unit 42 determines the necessary proof by examining the credential data 44, the proof data 46, the time data 52, and perhaps even the internal/system clock. Following the step 92 is a test step 94 which determines if the appropriate proof is available locally (i.e., in the proof data 46) and if the locally provided proof meets the necessary requirements (discussed elsewhere herein). If so, then control transfers from the step 94 to a step 96 where the validation unit 42 issues a pass signal. Following the step 96, processing is complete.

In some embodiments, it may be possible and desirable to obtain and store future proofs in the proof data 46. For example, a user that expects to be without a connection to the administration entity 28 and/or the proof distribution entity 32 may obtain and store future proofs. In these embodiments, the electronic device may automatically poll for future proofs when connected to the administration entity 28 and/or the proof distribution entity 32, which may be provided according to a predefined policy. Alternatively (or in addition), it may be possible for a user and/or electronic device to specifically request future proofs which may or may not be provided according to governing policy.

If it is determined at the test step 94 that the appropriate proof is not locally available (i.e., in the proof data 46), then control transfers from the test step 94 to a test step 98 where the validation unit 42 determines if an appropriate proof is available externally by, for example, providing a signal to cause the external interface 48 to attempt to fetch the proof, as discussed above. If it is determined that the test step 98 that the externally-provided proof meets the necessary requirements (discussed elsewhere here), then control transfers from the test step 98 to the step 96, discussed above, where the validation unit 42 issues a pass signal. In an embodiment herein, the externally-provided proof is stored in the proof data 46.

If it is determined at the test step 98 that an appropriate proof is not available externally, either because there is no appropriate connection or for some other reason, then control transfers from the test step 98 to a step 102 where the user is prompted to enter an appropriate proof. In an embodiment herein, if a user is at a location without an appropriate electrical connection, the user may call a particular phone number and receive an appropriate proof in the form of a number that may be entered manually into the electronic device in connection with the prompt provided at the step 102. Of course, the user may receive the proof by other means, such as being handwritten or typed or even published in a newspaper (e.g., in the classified section).

Following the step 102 is a test 104 which determines if the user has entered a proof meeting the necessary requirements (as described elsewhere herein). If so, then control transfers from the test step 104 to the step 96, discussed above, where the validation unit 42 issues a pass signal. Otherwise, control transfer from the test step 104 to a step 106 where the validation unit 42 issues a fail signal. Following the step 106, processing is complete.

Figure 5:
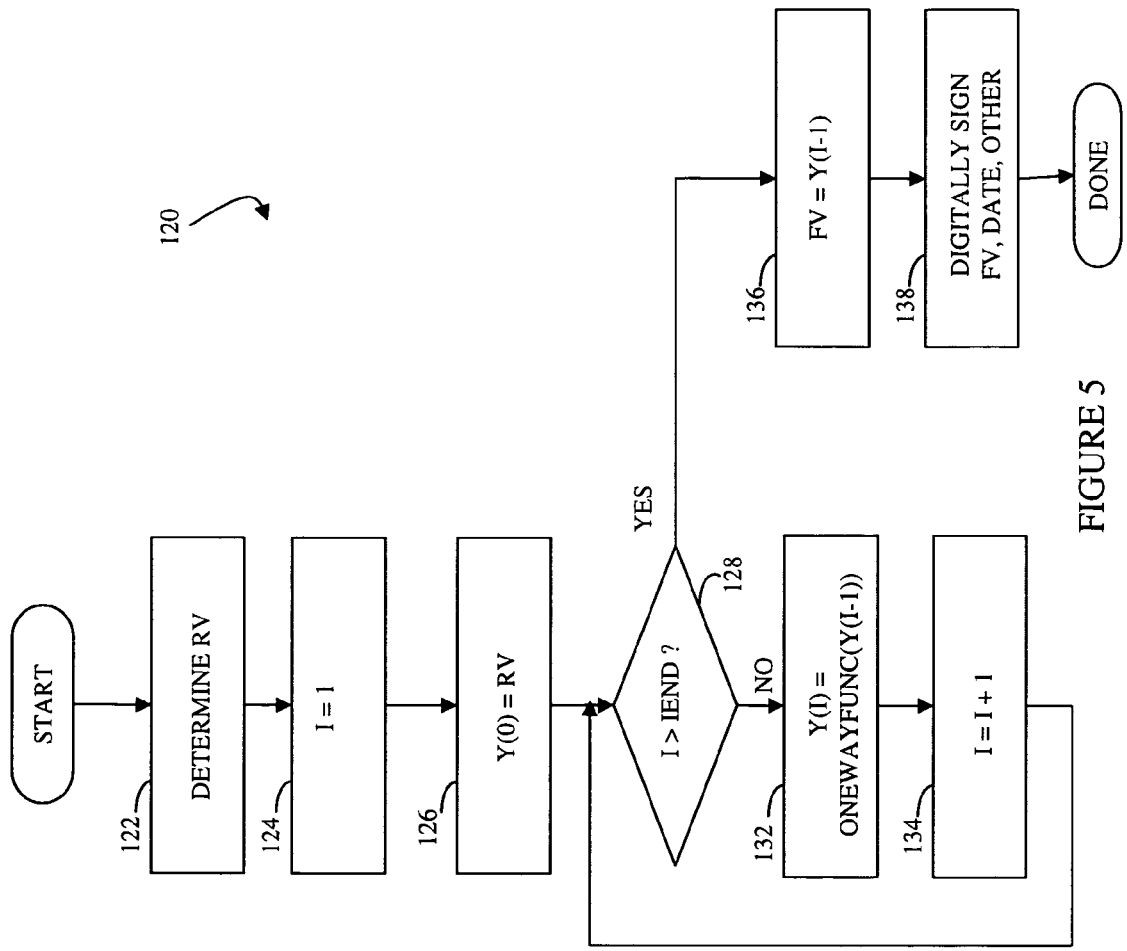
FIG. 5 is a flow chart illustrating steps performed in connection with generating credentials according to the system described herein.

Referring to FIG. 5, a flow chart 120 illustrates steps performed in connection with generating credentials used by the validation unit 42. The steps of the flow chart 120 may be performed by the administration entity 28 which generates the credentials (and a series of proofs) and provides the credentials to the electronic device 24. Other appropriate entities (e.g., entities authorized by the administration entity 28) may generate the credentials. The random value is used in connection with generating the credentials and the proofs and, in an embodiment herein, is generally unpredictable. Following the step 122 is a step 124 where an index variable, I, is set to one. In an embodiment herein, the credentials that are provided are used for an entire year and a new proof is needed each day so that three hundred and sixty five separate proofs may be generated in connection with generating the credentials. The index variable, I, is used to keep track of the number of proofs that are generated. Following step 124 is a step 126 where the initial proof value, Y(0) is set equal to the random value RV determined at the step 122.

Following the step 126 is a test step 128 which determines if the index variable, I, is greater than an ending value, IEND. As discussed above, in an embodiment herein, three hundred and sixty five proofs are generated in connection with generating the credentials so that, in this embodiment, IEND, is three hundred and sixty five. However, for other embodiments it is possible to set IEND to any number.

If it is determined at the test step 128 that the value of I is not greater than IEND, then control transfers from the step 128 to a step 132 where Y(I) is set equal to the one way function applied to Y(I−1). The one way function used at the step 132 is such that, given the result of applying the one way function, it is nearly impossible to determine the value that was input to the one way function. Thus, for the one way function used at the step 132, given Y(I), it is very difficult, if not impossible, to ascertain the value of the input (in this case Y(I−1)). As used herein, the term one way function includes any function or operation that appropriately provides this property, including, without limitation, conventional one way hash functions and digital signatures. This property of the one way function used at the step 132 is useful in connection with being able to store and distribute issued proofs in an unsecure manner, as discussed elsewhere herein. The credentials and the proofs may be generated at different times or the proofs may be regenerated at a later date by the entity that generated the credentials or by another entity. Note that, for other embodiments, it is possible to have Y(I) not be a function of Y(I−1) or any other Y's for that matter.

Processing begins at a first step 122 where a random value, RV, is generated. Following the step 132 is a step 134 where the index variable, I, is incremented. Following the step 134, control transfers back to the test step 128, discussed above. If it is determined at the test step 128 that I is greater than IEND, then control transfers from the test step 128 to a step 136 where a final value, FV, is set equal to Y(I−1). Note that one is subtracted from I because I was incremented beyond IEND. Following the step 136 is a step 138 where the administration entity 28 (or some other entity that generates the proofs and the credentials) digitally signs the final value, the current date, and other information that is used in connection with the proofs. In an embodiment herein, the other information may be used to identify the particular electronic device (e.g., laptop), the particular user, or any other information that binds the credentials and the proof to a particular electronic device and/or user and/or some other property. Optionally, the date and/or the FV may be combined with the other information. For example, it is possible to use an OCSP-like signed message that simply says, "device #123456 is valid on Jan. 1, 2004" or have a bit in a miniCRL that corresponds to a specific device be on or off. In those case, the credential on the device may authenticate the device (i.e., determine that the device really is device #123456, etc.). OCSP and miniCRL's are know in the art. Following the step 138, processing is complete.

Figure 6:
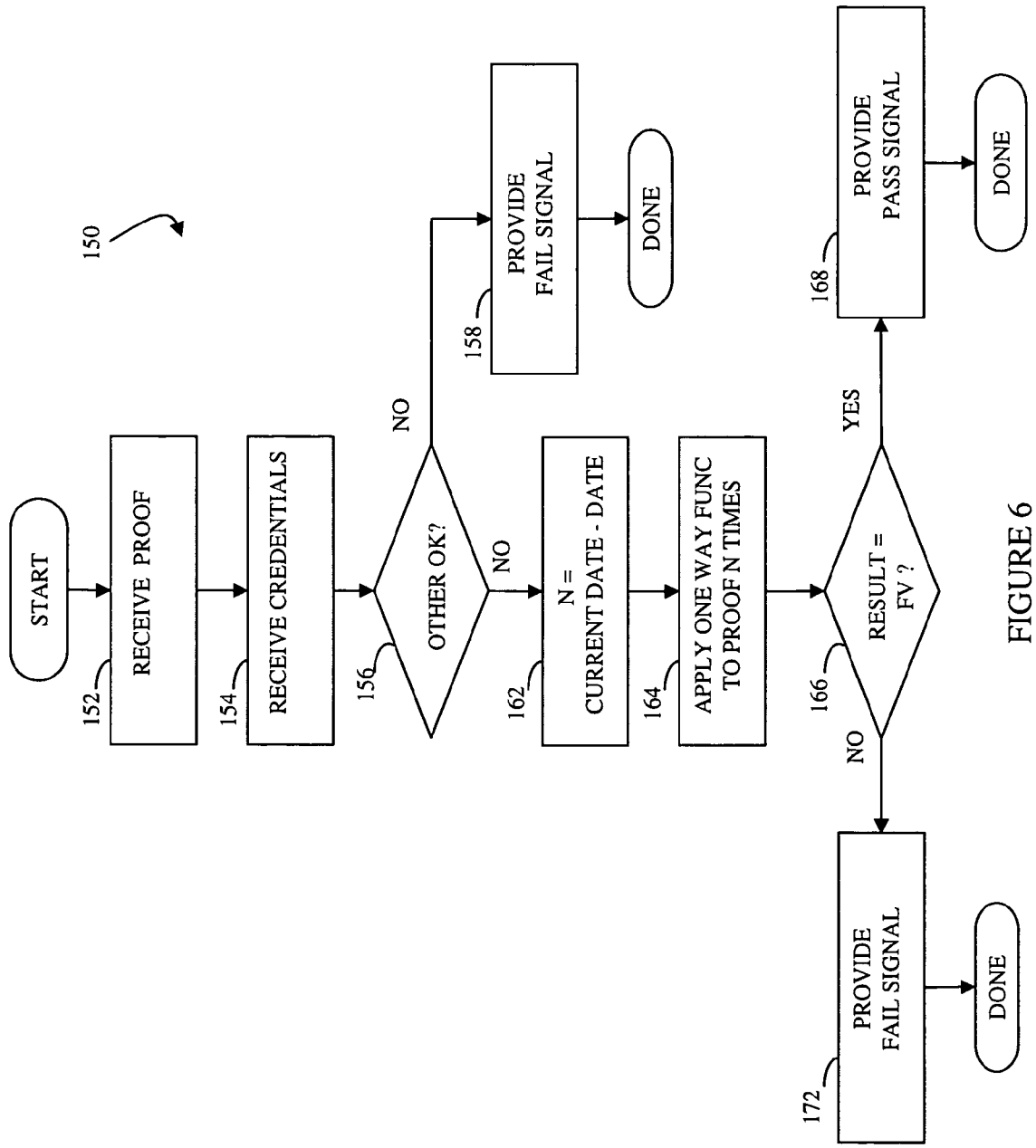
FIG. 6 is a flow chart illustrating steps performed in connection with checking proofs against credentials according to the system described herein.

Referring to FIG. 6, a flow chart 150 illustrates steps performed by the validation unit 42 in connection with determining the validity of a proof. Processing begins at a first step 152 where the validation unit 42 receives the proof (e.g., by reading the proof from the proof data 44). Following the step 152 is a step 154 where the validation unit 42 receives the credentials (e.g., by reading the credential data 46).

Following step 154 is a test step 156 which determines if the other information that is provided with the credentials is okay. As discussed elsewhere herein, the other information includes, for example, an identification of the electronic device, an identification of the user, or other property identifying information. If it is determined at the test step 156 that the other information associated with the credentials does not match the particular property described by the other information (e.g., the credentials are for a different electronic device or different user), then control transfers from the test step 156 to a step 158 where a fail signal is provided. Following the step 158, processing is complete.

If it is determined at the test step 156 that the other information associated with the credentials is okay, then control transfers from the test step 156 to a step 162 where a variable N is set equal to the current date minus the date associated with the credentials (i.e., the number of days since the credentials were issued). Following the step 162 is a step 164 where the proof value provided at the step 152 has a one way function applied thereto N times. The one way function used at the step 164 corresponds to the one way function used at the step 132, discussed above.

Following step 164 is a test step 166 which determines if the result obtained at the step 164 equals the final value FV that is part of the credentials received at the step 154. If so, then control transfers from the test step 166 to a step 168 where a pass signal is provided by the validation unit 42. Otherwise, if it is determined at the test step 166 that the result obtained at the step 164 does not equal the final value FV provided with the credentials at the step 154, then control transfers from the test step 166 to a step 172 where a fail signal is provided by the validation unit 42. Following step 172, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method for at least one administration entity to control access to an electronic device, comprising:
   the at least one administration entity generating credentials and a plurality of proofs for the electronic device, wherein the proofs are not determinable as valid given only the credentials and values for expired proofs, the expired proofs being no longer valid;
   the electronic device receiving the credentials;
   if access is authorized at a particular time, the electronic device receiving a corresponding proof corresponding to the particular time; and the electronic device confirming the corresponding proof using the credentials, wherein the corresponding proof is a result of applying a one way function to a subsequent one of the plurality of proofs received at the electronic device, wherein the credentials are a digital certificate that includes a final value that is a result of applying the one way function to a first one of the plurality of proofs, and wherein said access is access to data on the electronic device.

2. The method, according to claim 1, wherein the at least one administration entity generates the plurality of proofs after generating the credentials.

3. The method, according to claim 1, wherein a single administration entity generates the credentials and generates the plurality of proofs.

4. The method, according to claim 1, wherein there is a first administration entity that generates the credentials and other administration entities that generate the plurality of proofs.

5. The method, according to claim 4, wherein the first administration entity also generates the plurality of proofs.

6. The method, according to claim 4, wherein only the other administration entities generate the plurality of proofs.

7. The method, according to claim 1, wherein the digital certificate includes an identifier for the electronic device.

8. The method, according to claim 1, wherein the credentials include an identifier for the electronic device.

9. The method, according to claim 1, wherein the electronic device is a computer.

10. The method, according to claim 9, further comprising: the computer booting up only if access is authorized.

11. The method, according to claim 1, wherein the electronic device is a disk drive.

12. The method, according to claim 1, further comprising: providing the plurality of proofs using at least one proof distribution entity separate from the at least one administration entity.

13. The method, according to claim 12, wherein there is a single proof distribution entity.

14. The method, according to claim 12, wherein there are a plurality of proof distribution entities.

15. The method, according to claim 1, further comprising: providing the plurality of proofs using a connection to the electronic device.

16. The method, according to claim 15, wherein the connection is the Internet.

17. The method, according to claim 1, wherein at least one of the proofs is stored locally on the electronic device.

18. The method, according to claim 17, further comprising: if the corresponding proof corresponding to the particular time is not available locally on the electronic device, the electronic device requests the plurality of proofs via an external connection.

19. The method, according to claim 1, wherein each of the plurality of proofs is associated with a particular time interval.

20. The method, according to claim 19, wherein, after the particular time interval associated with a particular one of the plurality of proofs has passed, the electronic device receives a new proof.

21. The method, according to claim 20, wherein the particular time interval is one day.

22. A method for an electronic device to control access thereto, comprising:
receiving credentials and at least one of a plurality of proofs for the electronic device, wherein the at least one of the plurality of proofs is not determinable as valid given only the credentials and values for expired proofs, the expired proofs being no longer valid; and
testing, using at least one processor, the at least one of the plurality of proofs using the credentials, wherein, if access is authorized at a particular time, the at least one the plurality of proofs corresponds to the particular time, and wherein the at least one of the plurality of proofs is a result of applying a one way function to a subsequent one of the plurality of proofs, wherein the credentials are a digital certificate that includes a final value that is a result of applying the one way function to a first one of the plurality of proofs, and wherein said access is access to data on the electronic device.

23. The method, according to claim 22, wherein the digital certificate includes an identifier for the electronic device.

24. The method, according to claim 22, wherein the credentials include an identifier for the electronic device.

25. The method, according to claim 22, wherein the electronic device is a computer.

26. The method, according to claim 25, further comprising: the computer booting up only if access is authorized.

27. The method, according to claim 22, wherein the electronic device is a disk drive.

28. The method, according to claim 22, further comprising: obtaining the at least one of the plurality of proofs using a connection to the electronic device.

29. The method, according to claim 28, wherein the connection is the Internet.

30. The method, according to claim 22, wherein at least one of the plurality of proofs is stored locally on the electronic device.

31. The method, according to claim 30, further comprising: if the at least one of the plurality of proofs corresponding to the particular time is not available locally, the electronic device requests the at least one of the plurality of proofs via an external connection.

32. The method, according to claim 22, wherein each of the plurality of proofs is associated with a particular time interval.

33. The method, according to claim 32, wherein, after the particular time interval associated with a particular one of the plurality of proofs has passed, the electronic device receives a new proof.

34. The method, according to claim 33, wherein the particular time interval is one day.

35. A method of controlling access to an electronic device, comprising:
providing credentials to the electronic device; and
if access is allowed at a particular time, providing a proof from a plurality of proofs to the electronic device corresponding to the particular time, wherein the proof is not determinable as valid given only the credentials and values for expired proofs, the expired proofs being no longer valid, and wherein the proof provided to the electronic device is a result of applying, using at least one processor, a one way function to a subsequent proof provided to the electronic device, wherein the credentials are a digital certificate that includes a final value that is a result of applying the one way function to a first one of the plurality of proofs, and wherein said access is access to data on the electronic device.

36. The method, according to claim 35, wherein the digital certificate includes an identifier for the electronic device.

37. The method, according to claim 35, wherein the credentials include an identifier for the electronic device.

38. The method, according to claim 35, wherein the electronic device is a computer.

39. The method, according to claim 38, further comprising: the computer booting up only if access is authorized.

40. The method, according to claim 35, wherein the electronic device is a disk drive.

41. The method, according to claim 35, further comprising: providing the proof using at least one proof distribution entity separate from at least one administration entity that generates the proof.

42. The method, according to claim 41, wherein there is a single proof distribution entity.

43. The method, according to claim 41, wherein there are a plurality of proof distribution entities.

44. The method, according to claim 35, further comprising: providing the proof using a connection to the electronic device.

45. The method, according to claim 44, wherein the connection is the Internet.

46. The method, according to claim 35, wherein the proof is stored locally on the electronic device.

47. The method, according to claim 46, further comprising: if the proof not available locally, the electronic device requests the proof via an external connection.

48. The method, according to claim 35, wherein the proof is associated with a particular time interval.

49. The method, according to claim 48, wherein, after the particular time interval associated with the proof has passed, the electronic device receives a new proof.

50. The method, according to claim 49, wherein the particular time interval is one day.

* * * * *

UNITED STATES PATENT AND TRADEMARK OFFICE
CERTIFICATE OF CORRECTION

| | | |
|---|---|---|
| PATENT NO. | : 7,660,994 B2 | Page 1 of 1 |
| APPLICATION NO. | : 10/876275 | |
| DATED | : February 9, 2010 | |
| INVENTOR(S) | : Libin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1628 days.

Signed and Sealed this

Thirtieth Day of November, 2010

David J. Kappos
*Director of the United States Patent and Trademark Office*